(12) United States Patent
Malhotra

(10) Patent No.: US 6,495,243 B1
(45) Date of Patent: Dec. 17, 2002

(54) RECORDING SUBSTRATES FOR INK JET PRINTING

(75) Inventor: Shadi L. Malhotra, Mississauga (CA)

(73) Assignee: Xerox Corporation, Stamford, CT (US)

( * ) Notice: Subject to any disclaimer, the term of this patent is extended or adjusted under 35 U.S.C. 154(b) by 82 days.

(21) Appl. No.: 09/627,315

(22) Filed: Jul. 27, 2000

(51) Int. Cl.⁷ .................................................. B32B 3/00
(52) U.S. Cl. ................................................... 428/195
(58) Field of Search ................................. 428/195, 500

(56) References Cited

U.S. PATENT DOCUMENTS

| | | | |
|---|---|---|---|
| 4,500,607 A | 2/1985 | Louden et al. | 428/511 |
| 4,663,216 A | 5/1987 | Toyoda et al. | 428/212 |
| 4,705,719 A | 11/1987 | Yamanaka et al. | 428/323 |
| 4,734,336 A | 3/1988 | Oliver et al. | 428/537.5 |
| 4,741,969 A | 5/1988 | Hayama et al. | 428/514 |
| 4,770,934 A | 9/1988 | Yamasaki | 428/331 |
| 4,795,676 A | 1/1989 | Maekawa et al. | 428/328 |
| 4,868,581 A | 9/1989 | Mouri et al. | 346/1.1 |
| 4,887,097 A | 12/1989 | Akiya et al. | 346/135.1 |
| 4,903,039 A | 2/1990 | Light | 346/1.1 |
| 4,903,040 A | 2/1990 | Light | 346/1.1 |
| 4,903,041 A | 2/1990 | Light | 346/1.1 |
| 5,053,268 A | 10/1991 | Ehara et al. | 428/215 |
| 5,075,153 A | 12/1991 | Malhotra | 428/207 |
| 5,101,218 A | 3/1992 | Sakaki | 346/1.1 |
| 5,141,599 A | 8/1992 | Jahn et al. | 162/137 |
| 5,223,338 A | 6/1993 | Malhotra | 428/342 |
| 5,281,467 A | 1/1994 | Shimada et al. | 428/195 |
| 5,302,224 A | 4/1994 | Malhotra et al. | 162/135 |
| 5,302,437 A * | 4/1994 | Idei et al. | 428/195 |
| 5,314,747 A | 5/1994 | Malhotra et al. | 428/341 |
| 5,320,902 A | 6/1994 | Malhotra et al. | 428/342 |
| 5,354,813 A | 10/1994 | Farooq | 525/326.7 |
| 5,372,884 A | 12/1994 | Abe et al. | 428/331 |
| 5,397,619 A | 3/1995 | Kuroyama et al. | 428/141 |
| 5,403,955 A | 4/1995 | Farooq | 564/15 |
| 5,441,795 A | 8/1995 | Malhotra et al. | 428/195 |
| 5,457,486 A | 10/1995 | Malhotra et al. | 347/105 |
| 5,500,668 A | 3/1996 | Malhotra et al. | 347/105 |
| 5,541,627 A | 7/1996 | Quate | 347/10 |
| 5,561,454 A | 10/1996 | Kurabayashi et al. | 347/105 |
| 5,567,513 A | 10/1996 | Takeuchi et al. | 428/331 |
| 5,569,529 A | 10/1996 | Becker et al. | 428/331 |
| 5,663,004 A | 9/1997 | Malhotra et al. | 428/500 |
| 5,709,976 A | 1/1998 | Malhotra | 430/124 |
| 5,729,266 A | 3/1998 | Malhotra | 347/102 |
| 5,746,814 A | 5/1998 | Malhotra et al. | 106/18 |
| 5,757,408 A | 5/1998 | Malhotra | 347/105 |
| 5,759,701 A | 6/1998 | Malhotra | 428/500 |
| 5,759,734 A * | 6/1998 | Malhotra | 430/124 |
| 5,760,809 A | 6/1998 | Malhotra et al. | 347/105 |
| 5,846,637 A | 12/1998 | Malhotra et al. | 428/195 |
| 5,897,961 A * | 4/1999 | Malhotra et al. | 428/537.5 |
| 5,908,723 A | 6/1999 | Malhotra et al. | 430/31 |
| 5,910,359 A * | 6/1999 | Kobayashi et al. | 428/327 |
| 5,919,552 A | 7/1999 | Malhotra | 428/195 |
| 6,197,409 B1 * | 3/2001 | Bodager et al. | 428/212 |

* cited by examiner

*Primary Examiner*—Bruce H. Hess
*Assistant Examiner*—Michael E. Grendzynski
(74) *Attorney, Agent, or Firm*—Judith L. Byorick

(57) ABSTRACT

Disclosed is a recording substrate which comprises (a) a cellulosic substrate having a first surface and a second surface opposite the first surface; (b) on the first surface of the cellulosic substrate and in contact therewith, a first coating comprising (i) an extrudable polyester, (ii) a plasticizer, and (iii) an antistatic agent; (c) on the first surface of the cellulosic substrate and in contact with the first coating, a second coating comprising (i) a hydrophilic binder, (ii) an ink wetting agent, (iii) a lightfastness-imparting agent, (iv) a cationic dye mordant, (v) a filler, and (vi) an optional biocide; and (d) on the second surface of the cellulosic substrate and in contact therewith, a third coating comprising (i) an extrudable alkylene polymer, (ii) an antistatic agent, (iii) a lightfastness-imparting agent, (iv) a plasticizer, and (v) a filler.

37 Claims, No Drawings

RECORDING SUBSTRATES FOR INK JET PRINTING

Copending Application U.S. Ser. No. 09/627,245, filed concurrently herewith, entitled "Recording Substrates for Ink Jet Printing," with the named inventors Shadi L. Malhotra, Raymond W. Wong, Marcel P. Breton, and David N. MacKinnon, the disclosure of which is totally incorporated herein by reference, discloses a recording substrate which comprises (a) a cellulosic substrate having a first surface and a second surface opposite the first surface; (b) on the first surface of the cellulosic substrate and in contact therewith, a first coating comprising (i) a cold-water-soluble hydrophilic binder polymer, (ii) an ink spreading/ink wetting agent, (iii) a cationic dye mordant, (iv) a lightfastness-imparting agent, (v) a filler, and (vi) an optional biocide; (c) on the first surface of the cellulosic substrate and in contact with the first coating, a second coating comprising (i) a hot-water-soluble or alcohol-soluble material and (ii) a phosphonium salt; and (d) on the second surface of the cellulosic substrate and in contact therewith, a third coating comprising (i) a binder polymer with a glass transition temperature of from about −50 to about 50° C., (ii) an antistatic agent, (iii) a lightfastness-imparting agent, (iv) a filler, and (v) an optional biocide.

Copending Application U.S. Ser. No. 09/627,293, filed concurrently herewith, entitled "Recording Substrates for Ink Jet Printing," with the named inventors Shadi L. Malhotra, Subajinie Sathiyavanthan, and Marcel P. Breton, the disclosure of which is totally incorporated herein by reference, discloses a recording substrate which comprises (a) a cellulosic substrate having a first surface and a second surface opposite the first surface; and (b) on at least one surface of the cellulosic substrate and in contact therewith, a coating comprising (i) gelatin, (ii) a cationic acrylic latex polymer, (iii) a lightfastness-imparting agent, and (iv) an optional vinyl polymer.

BACKGROUND OF THE INVENTION

The present invention is directed to recording substrates suitable for use in ink jet printing processes. More specifically, the present invention is directed to coated papers that, when used in ink jet printing processes, enable generation of glossy prints that simulate those obtained with silver halide technology. One embodiment of the present invention is directed to a recording substrate which comprises (a) a cellulosic substrate having a first surface and a second surface opposite the first surface; (b) on the first surface of the cellulosic substrate and in contact therewith, a first coating comprising (i) an extrudable polyester, (ii) a plasticizer, and (iii) an antistatic agent; (c) on the first surface of the cellulosic substrate and in contact with the first coating, a second coating comprising (i) a hydrophilic binder, (ii) an ink wetting agent, (iii) a lightfastness-imparting agent, (iv) a cationic dye mordant, (v) a filler, and (vi) an optional biocide; and (d) on the second surface of the cellulosic substrate and in contact therewith, a third coating comprising (i) an extrudable alkylene polymer, (ii) an antistatic agent, (iii) a lightfastness-imparting agent, (iv) a plasticizer, and (v) a filler. Another embodiment of the present invention is directed to a printing process which comprises incorporating an ink into an ink jet printing apparatus and causing droplets of the ink to be ejected in an imagewise pattern onto a recording substrate of the present invention. In one specific embodiment, the printing apparatus employs an acoustic ink jet process, wherein droplets of the ink are caused to be ejected in imagewise pattern by acoustic beams. In another specific embodiment, the printing apparatus employs a hot melt ink jet process, wherein a solid ink is incorporated into the printing apparatus, and wherein the process comprises melting the ink and causing droplets of the melted ink to be ejected in an imagewise pattern onto the recording substrate.

Acoustic ink jet printing processes are known. In acoustic ink jet printing processes, an acoustic beam exerts a radiation pressure against objects upon which it impinges. Thus, when an acoustic beam impinges on a free surface (i.e., liquid/air interface) of a pool of liquid from beneath, the radiation pressure which it exerts against the surface of the pool may reach a sufficiently high level to release individual droplets of liquid from the pool, despite the restraining force of surface tension. Focusing the beam on or near the surface of the pool intensifies the radiation pressure it exerts for a given amount of input power. These principles have been applied to prior ink jet and acoustic printing proposals. For example, K. A. Krause, "Focusing Ink Jet Head," *IBM Technical Disclosure Bulletin*, Vol. 16, No. 4, September 1973, pp. 1168–1170, the disclosure of which is totally incorporated herein by reference, describes an ink jet in which an acoustic beam emanating from a concave surface and confined by a conical aperture was used to propel ink droplets out through a small ejection orifice. Acoustic ink printers typically comprise one or more acoustic radiators for illuminating the free surface of a pool of liquid ink with respective acoustic beams. Each of these beams usually is brought to focus at or near the surface of the reservoir (i.e., the liquid/air interface). Furthermore, printing conventionally is performed by independently modulating the excitation of the acoustic radiators in accordance with the input data samples for the image that is to be printed. This modulation enables the radiation pressure which each of the beams exerts against the free ink surface to make brief, controlled excursions to a sufficiently high pressure level for overcoming the restraining force of surface tension. That, in turn, causes individual droplets of ink to be ejected from the free ink surface on demand at an adequate velocity to cause them to deposit in an image configuration on a nearby recording medium. The acoustic beam may be intensity modulated or focused/defocused to control the ejection timing, or an external source may be used to extract droplets from the acoustically excited liquid on the surface of the pool on demand. Regardless of the timing mechanism employed, the size of the ejected droplets is determined by the waist diameter of the focused acoustic beam. Acoustic ink printing is attractive because it does not require the nozzles or the small ejection orifices which have caused many of the reliability and pixel placement accuracy problems that conventional drop on demand and continuous stream ink jet printers have suffered. The size of the ejection orifice is a critical design parameter of an ink jet because it determines the size of the droplets of ink that the jet ejects. As a result, the size of the ejection orifice cannot be increased, without sacrificing resolution. Acoustic printing has increased intrinsic reliability because there are no nozzles to clog. As will be appreciated, the elimination of the clogged nozzle failure mode is especially relevant to the reliability of large arrays of ink ejectors, such as page width arrays comprising several thousand separate ejectors. Furthermore, small ejection orifices are avoided, so acoustic printing can be performed with a greater variety of inks than conventional ink jet printing, including inks having higher viscosities and inks containing pigments and other particulate components. It has been found that acoustic ink printers embodying printheads comprising acoustically illuminated spherical focusing lenses can print precisely positioned pixels (i.e., picture elements) at resolutions which are sufficient for high quality printing of relatively complex images. It has also been discovered that the size of the individual pixels printed by such a printer can be varied over a significant range during operation, thereby accommodating, for example, the printing of variably shaded images. Furthermore, the known droplet ejector technology can be adapted to a variety of printhead configurations, including (1) single ejector embodiments for raster scan printing, (2) matrix configured ejector arrays for matrix printing, and (3) several different types of pagewidth ejector arrays, ranging from single row, sparse arrays for hybrid forms of parallel/serial printing to multiple row staggered arrays with individual ejectors for each of the pixel positions or addresses within a pagewidth image field (i.e., single ejector/pixel/line) for ordinary line printing. Inks suitable for acoustic ink jet printing typically are liquid at ambient temperatures (i.e., about 25° C.), but in other embodiments the ink is in a solid state at ambient temperatures and provision is made for liquefying the ink by heating or any other suitable method prior to introduction of the ink into the printhead. Images of two or more colors can be generated by several methods, including by processes wherein a single printhead launches acoustic waves into pools of different colored inks. Further information regarding acoustic ink jet printing apparatus and processes is disclosed in, for example, U.S. Pat. No. 4,308,547, U.S. Pat. No. 4,697,195, U.S. Pat. No. 5,028,937, U.S. Pat. No. 5,041,849, U.S. Pat. No. 4,751,529, U.S. Pat. No. 4,751,530, U.S. Pat. No. 4,751,534, U.S. Pat. No. 4,801,953, and U.S. Pat. No. 4,797,693, the disclosures of each of which are totally incorporated herein by reference. The use of focused acoustic beams to eject droplets of controlled diameter and velocity from a free-liquid surface is also described in *J. Appl. Phys.*, vol. 65, no. 9 (May 1, 1989) and references therein, the disclosure of which is totally incorporated herein by reference.

In acoustic ink printing processes, the printhead produces approximately 2.2 picoliter droplets by an acoustic energy process. The ink under these conditions preferably displays a melt viscosity of from about 1 to about 25 centipoise at the jetting temperature. In addition, once the ink has been jetted onto the printing substrate, the image thus generated preferably exhibits excellent crease properties, and is nonsmearing, waterfast, of excellent transparency, and of excellent fix. The vehicle preferably displays a low melt viscosity in the acoustic head while also displaying solid like properties after being jetted onto the substrate. Since the acoustic head can tolerate temperatures typically up to about 180° C., the vehicle for the ink preferably displays liquid-like properties (such as a viscosity of from about 1 to about 25 centipoise) at a temperature of from about 75 to about 180° C., and solidifies or hardens after being jetted onto the substrate such that the resulting image exhibits a hardness value of from about 0.1 to about 0.5 millimeter (measured with a penetrometer according to the ASTM penetration method D1321).

Ink jet printing processes that employ inks that are solid at room temperature and liquid at elevated temperatures are known. For example, U.S. Pat. No. 4,490,731, the disclosure of which is totally incorporated herein by reference, discloses an apparatus for dispensing solid inks for printing on a substrate such as paper. The ink vehicle is chosen to have a melting point above room temperature so that the ink, which is melted in the apparatus, will not be subject to evaporation or spillage during periods of nonprinting. The vehicle selected possesses a low critical temperature to permit the use of the solid ink-in a thermal ink jet printer. In thermal ink jet printing processes employing these phase-change inks, the solid ink is melted by a heater in the printing apparatus and used as a liquid in a manner similar to that of conventional piezoelectric or thermal ink jet printing. Upon contact with the printing substrate, the molten ink solidifies rapidly, enabling the dye to remain on the surface instead of being carried into the paper by capillary action, thereby enabling higher print density than is generally obtained with liquid inks. After the phase-change ink is applied to the substrate, freezing on the substrate resolidifies the ink., In phase-change printing processes, the ink preferably undergoes a change with temperature from a solid state to a liquid state in a desirably short period of time, typically in less than about 100 milliseconds. One advantage of phase-change inks is their ability to print superior images on plain paper, since the phase-change ink quickly solidifies as it cools, and, since it is primarily waxy in nature, it does not normally soak into a paper medium.

Phase-change inks also preferably exhibit a high degree of transparency, generally measured in terms of haze value of the ink. Transparent, low haze inks exhibit high gloss and high optical density compared to opaque inks, although both may appear to be evenly colored.

The use of phase-change inks in acoustic ink printing processes is also known. U.S. Pat. No. 4,745,419 (Quate et al.), the disclosure of which is totally incorporated herein by reference, discloses acoustic ink printers of the type having a printhead including one or more acoustic droplet ejectors for supplying focused acoustic beams. The printer comprises a carrier for transporting a generally uniformly thick film of hot melt ink across its printhead, together with a heating means for liquefying the ink as it nears the printhead. The droplet ejector or ejectors are acoustically coupled to the ink via the carrier, and their output focal plane is essentially coplanar with the free surface of the liquefied ink, thereby enabling them to eject individual droplets of ink therefrom on command. The ink, on the other hand, is moved across the printhead at a sufficiently high rate to maintain the free surface which it presents to the printhead at a substantially constant level. A variety of carriers may be employed, including thin plastic and metallic belts and webs, and the free surface of the ink may be completely exposed or it may be partially covered by a mesh or perforated layer. A separate heating element may be provided for liquefying the ink, or the lower surface of the carrier may be coated with a thin layer of electrically resistive material for liquefying the ink by localized resistive heating.

U.S. Pat. No. 5,541,627 (Quate), the disclosure of which is totally incorporated herein by reference, discloses a method and apparatus for ejecting droplets from the crests of capillary waves riding on the free surface of a liquid by parametrically pumping the capillary waves with electric fields from probes located near the crests. Crest stabilizers are beneficially used to fix the spatial locations of the capillary wave crests near the probes. The probes are beneficially switchably connected to an AC voltage supply having an output that is synchronized with the crest motion. When the AC voltage is applied to the probes, the resulting electric field adds sufficient energy to the system so that the surface tension of the liquid is overcome and a droplet is ejected. The AC voltage is synchronized such that the droplet is ejected about when the electric field is near is minimum value. A plurality of droplet ejectors are arranged and the AC voltage is switchably applied so that ejected droplets form a predetermined image on a recording surface. The capillary waves can be generated on the free surface of the liquid by using acoustical energy at a level approaching the onset of droplet ejection. The liquid used with the invention must also must be attracted by an electric field.

Phase-change inks used in acoustic ink printing processes also preferably exhibit a low acoustic loss value, typically below about 100 decibels per millimeter. In addition, the ink vehicle preferably can fill the pores of a porous substrate, such as paper, and preferably has a melting point of from about 80 to about 120° C.; this melting point, along with low acoustic loss, enables a minimization of energy consumption. When the phase-change inks are used in an electric field assisted acoustic ink printing process, the inks also are sufficiently conductive to permit the transmission of electrical signals generated by the electric field assisted acoustic ink jet printer; the inks preferably exhibit a conductivity of from about 2 to about 9 log(picomho/cm) (measured under melt conditions at about 150° C. by placing an aluminum electrode in the molten ink and reading the resistivity output on a GenRad 1689 precision RLC Digibridge at a frequency of 1 kiloHertz). In general, the conductivity of a material can be measured in terms of the reciprocal of resistivity, which is the capacity for electrical resistance. Further information regarding electric field assisted acoustic ink printing processes is disclosed in, for example, Copending Application U.S. Ser. No. 09/280,717, filed Mar. 30, 1999, entitled "Method and Apparatus for Moving Ink Drops using an Electric Field and Transfuse Printing System Using the Same," with the named inventors John S. Berkes, Vittorio R. Castelli, Scott A. Elrod, Gregory J. Kovacs, Meng H. Lean, Donald L. Smith, Richard G. Stearns, and Joy Roy, the disclosure of which is totally incorporated herein by reference, which discloses a method of forming and moving ink drops across a gap between a printhead and a print medium or intermediate print medium in a marking device. The method includes generating an electric field, forming the ink drops adjacent to the printhead, and controlling the electric field. The electric field is generated to extend across the gap. The ink drops are formed in an area adjacent to the printhead. The electric field is controlled such that an electrical attraction force exerted on the formed ink drops by the electric field is the greatest force acting on the ink drops. The marking device can be incorporated into a transfuse printing system having an intermediate print medium made of one or more materials that allow for lateral dissipation of electrical charge from the incident ink drops.

U.S. Pat. No. 5,919,552 (Malhotra), the disclosure of which is totally incorporated herein by reference, discloses a coated paper and a method for creating gloss on an image, by (A) providing a substrate having a right reading toner image formed thereon using a nonphotographic imaging process; (B) providing a backing substrate having one surface thereof coated with four coatings in a layered structure where (1) a first coating in contact with the substrate is a release composition comprised of a release polymer and a monomeric release molecule, (2) a second coating on the top of the release coating is a scuff resistant, lightfast, waterfast transparent polymeric coating comprised of a hydrophobic binder, a lightfastness inducing agent, an antistatic agent, a flavor imparting material, and a filler, (3) a third adhesive coating on the top of the second coating comprising a polymeric adhesive binder having a glass transition temperature of between −50° C. to about 55° C., an antistatic agent, a lightfastness composition, (4) a fourth toner wetting coating on the top, of the third adhesive coating comprising a hydrophilic polymer having a melting point of from about 50° C. to about 100° C.; and (C) laminating the imaged substrate to the backing substrate with heat at about 120° C. to about 180° C. and a pressure of about 25 to about 200 psi, and transferring the scuff resistant coating from the release substrate on to the image to generate glossy images.

U.S. Pat. No. 5,908,723 (Malhotra et al.), the disclosure of which is totally incorporated herein by reference, discloses opaque plastic recording sheets comprising (A) a substrate, (B) a receiving coating on the front side of the substrate capable of absorbing an ink vehicle and which receiving layer coating comprises (1) a hydrophobic binder polymer, (2) an ink wetting agent, (3) an ink spreading agent, (4) a dye mordant, (5) a lightfastness agent, (6) a filler, (7) an optional biocide; and (C) a toner receiving coating in contact with the reverse side of the substrate and which coating is comprised of (1) a binder polymer, (2) toner wetting and spreading agent, (3) an antistatic agent, (4) a pigment, (5) a lightfast agent, and (6) an optional biocide.

U.S. Pat. No. 5,897,961 (Malhotra et al.), the disclosure of which is totally incorporated herein by reference, discloses a coated ink jet paper with (1) a cellulosic substrate, (2) a first ink receiving coating on the front side of the substrate capable of absorbing an ink vehicle, and which receiving layer coating comprises (a) a hydrophilic binder polymer, (b) an ink wetting/ink spreading agent, (c) a dye mordant, (d) a lightfastness agent, (e) a filler, (f) a biocide; and (3) a second traction controlling coating in contact with the reverse side of the substrate, and which coating comprises a polymer with a glass transition temperature of from between about −50° C. to about 50° C., a lightfastness agent, an antistatic agent, a pigment, and a biocide. The cellulosic substrate can comprise alkaline sized and acid sized blends of hardwood kraft and softwood kraft fibers, which blends contain from about 20 percent to 80 percent by weight of softwood and from about 80 to about 20 percent by weight of hardwood. The sizing value of the cellulosic substrate varies between 50 seconds to 500 seconds, the porosity varies from 100 to 600 mil/minute, and the thickness varies between 50 microns to 250 microns.

U.S. Pat. No. 5,846,637 (Malhotra et al.), the disclosure of which is totally incorporated herein by reference, discloses a coated xerographic photographic paper comprising (1) a cellulosic substrate; (2) a first antistatic coating layer in contact with one surface of the substrate; (3) a second toner receiving coating on the top of the antistatic layer, and comprising a mixture of a binder polymer, a toner spreading agent, a lightfastness inducing agent, a biocide, and a filler; and (4) a third traction controlling coating in contact with the back side of the substrate comprised of a mixture of a polymer with a glass transition temperature of from between about −50° C. to about 50° C., an antistatic agent, a lightfastness agent, a biocide and a pigment. The traction promoting third coating is also capable of receiving images from a xerographic copier/printer. The cellulosic substrate comprises alkaline sized and acid sized blends of hardwood kraft and softwood kraft fibers, which blends contain from about 10 percent to about 90 percent by weight of softwood and from about 90 to about 10 percent by weight of hardwood. The sizing value of the cellulosic substrate varies between 200 seconds to 1,100 seconds, the porosity varies from 50 to 300 mil/minute, and the thickness varies between 50 microns to 250 microns.

U.S. Pat. No. 5,760,809 (Malhotra et al.), the disclosure of which is totally incorporated herein by reference, discloses a recording sheet which comprises a base sheet, a phosphonium compound, an optional pigment, and an optional binder. Also disclosed are a process which comprises applying an aqueous recording liquid to the recording sheet in an imagewise pattern and a printing process which comprises (1) incorporating into an ink jet printing apparatus containing an aqueous ink the aforementioned recording sheet, and (2) causing droplets of the ink to be ejected in an imagewise pattern onto the recording sheet, thereby generating images on the recording sheet.

U.S. Pat. No. 5,759,701 (Malhotra), the disclosure of which is totally incorporated herein by reference, discloses a recording sheet which comprises a substrate and a material selected from the group consisting of monomeric amine acid salts, monomeric quaternary choline halides, and mixtures thereof.

U.S. Pat. No. 5,757,408 (Malhotra), the disclosure of which is totally incorporated herein by reference, discloses a recording sheet which comprises a paper substrate and a material selected from the group consisting of monomeric amino acids, monomeric hydroxy acids, monomeric polycarboxyl compounds, and mixtures thereof. Another embodiment is directed to a recording sheet which comprises a substrate and a material selected from the group consisting of monomeric amino acids, monomeric hydroxy acids, and mixtures thereof.

U.S. Pat. No. 5,746,814 (Malhotra et al.), the disclosure of which is totally incorporated herein by reference, discloses a curl preventing/minimizing fluid composition containing a hydrophilic solvent, a polymeric binder, a water soluble/dispersible paper desizing agent, a water soluble/dispersible paper anticurl agent, a defoamer, a biocide, an antistatic agent, a lightfastness promoting agent, and a filler.

U.S. Pat. No. 5,729,266 (Malhotra), the disclosure of which is totally incorporated herein by reference, discloses a recording sheet which comprises a substrate and a material selected from the group consisting of oxazole compounds, isooxazole compounds, oxazolidinone compounds, oxazoline salt compounds, morpholine compounds, thiazole compounds, thiazolidine compounds, thiadiazole compounds, phenothiazine compounds, and mixtures thereof. Also disclosed is a recording sheet which consists essentially of a substrate, at least one material selected from the group consisting of oxazole compounds, isooxazole compounds, oxazolidinone compounds, oxazoline salt compounds, morpholine compounds, thiazole compounds, thiazolidine compounds, thiadiazole compounds, phenothiazine compounds, and mixtures thereof, an optional binder, an optional antistatic agent, an optional biocide, and an optional filler.

U.S. Pat. No. 5,709,976 (Malhotra), the disclosure of which is totally incorporated herein by reference, discloses a coated paper which comprises (a) a substrate; (b) a hydrophobic barrier layer comprising a water insoluble component and a water or alcohol soluble anticurl agent, said hydrophobic barrier layer being present on both sides of the substrate; (c) image receiving coatings situated on the top of both hydrophobic barrier layers, said image receiving coatings being suitable for receiving images of an aqueous ink, said coatings comprising (1) a polymeric binder, (2) a dye fixative, (3) a pigment, (4) a lightfastness inducing agent, and (5) a biocide. In another embodiment, the invention is directed to a coated paper which comprises (a) a substrate; (b) a hydrophobic barrier layer comprised of a water insoluble component, and a water or alcohol soluble anticurl agent, said hydrophobic barrier layer being present on both sides of the substrate; (c) image receiving coatings situated on the top of both hydrophobic barrier layers, said image receiving coatings being suitable for receiving images developed with electrostatic toner compositions, said coatings comprising (1) a polymeric binder, (2) an antistatic agent, (3) a lightfastness inducing agent, (4) a pigment, and (5) an optional biocide.

U.S. Pat. No. 5,663,004 (Malhotra et al.), the disclosure of which is totally incorporated herein by reference, discloses a recording sheet which comprises a substrate, an image receiving coating, and a biocide.

U.S. Pat. No. 5,569,529 (Becker et al.), the disclosure of which is totally incorporated herein by reference, discloses ink jet printing materials comprising a support and an ink receiving layer containing a pigment, a hydrophilic binder comprising polyvinyl alcohol, vinylpyrrolidone homopolymer and/or vinylpyrrolidone copolymer, and a water soluble compound containing aldehyde groups.

U.S. Pat. No. 5,567,513 (Takeuchi et al.), the disclosure of which is totally incorporated herein by reference, discloses an ink-jet recording paper sheet for ink-jet recording with on-demand type heads having a multi-nozzle which comprises a recording layer formed on one face of a base paper sheet to give a basis weight of the recording paper of from 150 to 250 $g/m^2$ with a coating color which contains a pigment and a binder, the pigment containing synthetic silica having a BET specific surface area ranging from 250 to 500 $m^2/g$ at a content of not less than 80 percent by weight of the pigment, the binder containing casein and styrene-butadiene rubber, the weight ratio of the pigment to the binder ranging from 1.8 to 2.4, the recording layer having coating solid in an amount ranging from 15 to 25 $g/m^2$, and surface roughness by ten-point-height of the recording layer ranging from 0.5 to 5 $\mu$m, and the paper sheet being curled at a maximum curling height ranging from 0 to 20 mm in A4 paper size with the printed face upside. An ink-jet recording method ejects ink droplets by thermo energy from an on-demand type head having a plurality of nozzles onto the recording paper sheet.

U.S. Pat. No. 5,561,454 (Kurabayashi et al.), the disclosure of which is totally incorporated herein by reference, discloses a recording medium having at least a pigment and a binder on the surface of a base, wherein the binder comprises at least water-soluble polyester. An ink jet recording method includes the step of performing recording on a recording medium by discharging ink from an orifice of an ink jet recording head in accordance with recording signals, wherein the recording medium has at least a pigment and a binder on the surface of a base, and wherein the binder is comprised of at least water-soluble polyester. The amount of the water-soluble polyester is 40 percent or more with respect to the total weight of the binder.

U.S. Pat. No. 5,500,668 (Malhotra et al.), the disclosure of which is totally incorporated herein by reference, discloses a printing process which comprises (a) providing a recording sheet which comprises a substrate, at least one monomeric salt, an optional binder, an optional antistatic agent, an optional biocide, and an optional filler; (b) applying an aqueous recording liquid to the recording sheet in an imagewise pattern; and (c) thereafter exposing the substrate to microwave radiation, thereby drying the recording liquid on the recording sheet.

U.S. Pat. No. 5,457,486 (Malhotra et al.), the disclosure of which is totally incorporated herein by reference, discloses a recording sheet which comprises (a) a base sheet; (b) a material selected from the group consisting of tetrazolium compounds, indolinium compounds, imidazolinium compounds, and mixtures thereof; (c) an optional pigment; and (d) an optional binder.

U.S. Pat. No. 5,441,795 (Malhotra et al.), the disclosure of which is totally incorporated herein by reference, discloses a recording sheet which comprises a base sheet and a material selected from the group consisting of pyridinium compounds, piperazinium compounds, and mixtures thereof.

U.S. Pat. No. 5,403,955 (Farooq), the disclosure of which is totally incorporated herein by reference, discloses mordants based upon a polyethyleneimine backbone and either pendant phosphonium or quaternized-nitrogen compounds. The mordants find use in stopping or controlling ink-bleeding into ink-jet receptors and photographic films.

U.S. Pat. No. 5,397,619 (Kuroyama et al.), the disclosure of which is totally incorporated herein by reference, discloses an ink jet recording paper characterized in that it comprises a base paper wherein at least one surface has a recording layer, this recording layer containing at least 40 weight percent of a pigment and no more than 60 weight percent of a binder, the surface roughness by ten point height on the recording layer surface being no more than 5 $\mu$m, and the air permeability of the recording paper being no more than 1,000 seconds and a manufacturing process thereof.

U.S. Pat. No. 5,372,884 (Abe et al.), the disclosure of which is totally incorporated herein by reference, discloses an ink jet recording sheet comprising a support and an ink receiving layer provided on at least one side of the support wherein said ink receiving layer contains a cation-modified non-spherical colloidal silica. The cation-modifier used is preferably hydrous aluminum oxide, hydrous zirconium oxide, or hydrous tin oxide. The ink jet recording sheet is high in gloss, quick in drying of ink and superior in water resistance of ink jet recorded images and film formability of the ink receiving layer.

U.S. Pat. No. 5,354,813 (Farooq et al.), the disclosure of which is totally incorporated herein by reference, discloses classes of polymeric mordants based upon poly(vinylpyridine), poly(N-vinylimidazoles), and poly(meth)acrylates. The polymeric mordants contain N-heterocycles which are N-quaternized by different types of alkylated hydrazones, semicarbazones, and multiple-quaternized alkylated salts serving as pendant groups.

U.S. Pat. No. 5,320,902 (Malhotra et al.), the disclosure of which is totally incorporated herein by reference, discloses a recording sheet which consists essentially of a substrate and, in contact with the substrate, a monoammonium compound of the formula:

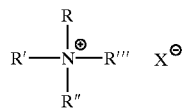

wherein R is an alkyl group, X is selected from the group consisting of fluoride, chloride, bromide, iodide, and astatide, and R', R", and R'" are each independently selected from the group consisting of alkyl groups, substituted alkyl groups, aryl groups, substituted aryl groups, arylalkyl groups, and substituted arylalkyl groups, wherein R, R', R" and R'" are either the same as or different from each other; and mixtures thereof; an optional binder component; and an optional filler component.

U.S. Pat. No. 5,314,747 (Malhotra et al.), the disclosure of which is totally incorporated herein by reference, discloses a recording sheet which comprises (a) a base sheet, (b) a cationic sulfur compound selected from the group consisting of sulfonium compounds, thiazolium compounds, benzothiazolium compounds, and mixtures thereof; (c) an optional binder; and (d) an optional pigment.

U.S. Pat. No. 5,302,249 (Malhotra et al.), the disclosure of which is totally incorporated herein by reference, discloses a paper comprising a supporting substrate with a coating which comprises a desizing component and a hydrophilic polymer, and more specifically in an embodiment the paper comprises a paper comprising a supporting substrate treated with desizing agents selected from the group consisting of (1) hydrophilic poly(dialkylsiloxanes); (2) poly(alkylene glycol); (3) poly(propylene oxide)-poly(ethylene oxide) copolymers; (4) fatty ester modified compounds of phosphate, sorbitan, glycerol, poly(ethylene glycol), sulfosuccinic acid, sulfonic acid and alkyl amine; (5) poly(oxyalkylene) modified compounds of sorbitan esters, fatty amines, alkanol amides, castor oil, fatty acids and fatty alcohols; (6) quaternary alkosulfate compounds; (7) fatty imidazolines; and mixtures thereof.

U.S. Pat. No. 5,281,467 (Shimada et al.), the disclosure of which is totally incorporated herein by reference, discloses an ink jet recording paper having a support provided on at least one surface with a pigment-containing coating in accordance with a cast coating method, with said pigment comprising at least 50 weight percent of a calcium carbonate-compounded silica, whereby achieving excellent ink absorption, smoothness, gloss and water resistance together with an excellent dot density, sharpness and roundness to ensure recording of high quality, high contrast full color images.

U.S. Pat. No. 5,223,338 (Malhotra), the disclosure of which is totally incorporated herein by reference, discloses a recording sheet comprising a substrate and a coating consisting essentially of an optional binder, an optional filler, and quaternary ammonium polymers selected from

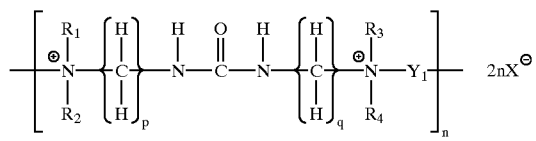

wherein n is an integer from 1 to 200, $R_1$, $R_2$, $R_3$, and $R_4$ are selected from alkyl, hydroxyalkyl, and polyoxyalkylene, p is an integer from 1 to 10, q is an integer from 1 to 10, X is an anion, and $Y_1$ is selected from —$CH_2CH_2OCH_2CH_2$—, —$CH_2CH_2OCH_2CH_2OCH_2CH_2$—, —$(CH_2)k$— wherein k is an integer from 2 to 10, and —$CH_2CH(OH)CH_2$—;

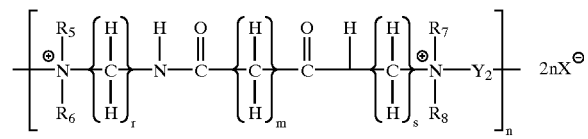

wherein n is an integer from 1 to 200, $R_5$, $R_6$, $R_7$, and $R_8$ are selected from alkyl, hydroxyalkyl, and polyoxyalkylene, m is an integer from 0 to 40, r is an integer from 1 to 10, s is an integer from 1 to 10, X is an anion, and $Y_2$ is selected from —$CH_2CH_2OCH_2CH_2$—, —$CH_2CH_2OCH_2CH_2OCH_2CH_2$—, —$(CH_2)k$— wherein k is an nteger from 2 to 10, and —$CH_2CH(OH)CH_2$—;

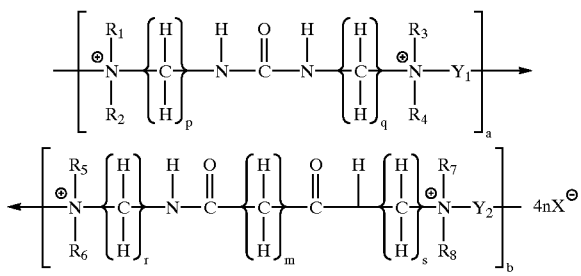

wherein a and b are integers wherein the sum of a+b is from 2 to 200, $R_1$, $R_2$, $R_3$, $R_4$, $R_5$, $R_6$, $R_7$, and $R_8$ are selected from alkyl, hydroxyalkyl, and polyoxyalkylene, p is an integer from 1 to 10, q is an integer from 1 to 10, X is an anion, and $Y_1$ and $Y_2$ are selected from —$CH_2CH_2OCH_2CH_2$—, —$CH_2CH_2OCH_2CH_2OCH_2CH_2$—, —$(CH_2)k$— wherein k is an integer from 2 to 10, and —$CH_2CH(OH)CH_2$—. Mixtures of these polymers are also suitable.

U.S. Pat. No. 5,141,599 (Jahn et al.), the disclosure of which is totally incorporated herein by reference, discloses a receiving material for ink-jet printing that includes a polyolefin coated base paper and an ink receiving layer applied on the front face thereof, and the receiving layer contains a mixture of gelatin and starch.

U.S. Pat. No. 5,101,218 (Sakaki et al.), the disclosure of which is totally incorporated herein by reference, discloses a recording medium comprising a substrate and a non-porous ink receiving layer. The ink receiving layer contains a water-insoluble polymer containing a cationic resin. The recording medium may be employed for recording by attaching droplets of a recording liquid thereon.

U.S. Pat. No. 5,075,153 (Malhotra), the disclosure of which is totally incorporated herein by reference, discloses a never-tear coated paper comprising a plastic supporting substrate, a binder layer comprising polymers selected from the group consisting of (1) hydroxypropyl cellulose, (2) poly(vinyl alkyl ether), (3) vinyl pyrrolidone/vinyl acetate, (4) quaternized vinyl pyrrolidone/dialkyalkylaminoethyl/ methacrylate, (5) poly(vinyl pyrrolidone), (6) poly(ethylene imine), and mixtures thereof; and a pigment, or pigments; and an ink receiving polymer layer.

U.S. Pat. No. 5,053,268 (Ehara et al.), the disclosure of which is totally incorporated herein by reference, discloses a composite paper suitable for use as writing paper, printing paper, or copying paper which includes a synthetic resin film having a thickness of 12–30 $\mu$m, and a paper sheet laminated on each side of the synthetic resin film and having a Bekk smoothness of 60–120 seconds, a density of 0.8–1.0 g/cm³, a degree of sizing of 0.5–1.5 seconds, and a thickness of 20–25 $\mu$m.

U.S. Pat. No. 4,903,041 (Light), the disclosure of which is totally incorporated herein by reference, discloses transparent image-recording elements that contain ink-receptive layers; that can be imaged by the application of liquid ink dots. The ink-receptive layers contain a combination of a vinyl pyrrolidone polymer with a polyester, a poly (cyclohexylenedimethylene-co-xylylene terephthalate-co-malonate-co-sodioiminobis(sulfonylbenzodte)) dispersed in the vinyl pyrrolidone to control ink dot size. A printing method which employs the transparent image-recording elements is described.

U.S. Pat. No. 4,903,040 (Light), the disclosure of which is totally incorporated herein by reference, discloses transparent image-recording elements that contain ink-receptive layers that can be imaged by the application of liquid ink dots. The ink-receptive layers contain a combination of a vinyl pyrrolidone polymer with, a polyester, a poly (cyclohexanedimethylene isophthalate-co-sodiosulfobenzenedicarboxylate), dispersed in the vinyl pyrrolidone to control ink dot size. A printing method which employs the transparent image-recording elements is described.

U.S. Pat. No. 4,903,039 (Light), the disclosure of which is totally incorporated herein by reference, discloses transparent image-recording elements that contain ink-receptive layers that can be imaged by the application of liquid ink dots. The ink-receptive layers contain a combination of a vinyl pyrrolidone polymer with a polyester, a poly (cyclohexane-dimethylene-co-oxydiethylene isophthalate-co-sodio-sulfobenzenedicarboxylate), dispersed in the vinyl pyrrolidone to control ink dot size. A printing method which employs the transparent image-recording elements is described.

U.S. Pat. No. 4,887,097 (Akiya et al.), the disclosure of which is totally incorporated herein by reference, discloses a recording medium having a substrate and an ink-receiving layer provided on said substrate, wherein said ink-receiving layer contains, in combination, solvent-soluble resin (A) that is capable of absorbing water in an amount of 0.5 times or more as much as its own weight and is substantially water-insoluble, and particles of solvent-insoluble resin (B) that is capable of absorbing water in an amount of 50 times or more as much as its own weight.

U.S. Pat. No. 4,868,581 (Mouri et al.), the disclosure of which is totally incorporated herein by reference, discloses an ink-receiving composite polymer material wherein a nonvolatile organic compound is caused to penetrate into and diffuse through an ink-receiving polymer forming, from any one surface side thereof, and a recording medium for ink-jet recording wherein a nonvolatile organic compound is caused to penetrate into and diffuse through an ink-receiving layer, from the surface thereof.

U.S. Pat. No. 4,795,676 (Maekawa et al.), the disclosure of which is totally incorporated herein by reference, discloses an electrostatic recording material being composed of a multi-layered sheet support having an electroconductive layer and a dielectric layer formed successively thereon, wherein the number of projections having a height of 10 $\mu$m or more from the flat surface is limited to a maximum of 50 per 0.1 m², so that the material has excellent properties and can produce prints of very high quality.

U.S. Pat. No. 4,770,934 (Yamasaki et al.), the disclosure of which is totally incorporated herein by reference, discloses an ink jet recording medium having at least one ink receptive layer containing synthetic silica of fine particle form as a main pigment, having a recording surface dried by pressing said recording surface against a heated mirror surface, and having ink receptive layer having an absorption capacity of at least 10 g/m². An ink jet recording medium has a gloss without requiring any post-treatment for imparting the gloss, has a high ink absorbability and gives a high color reproducibility and a high color density in printing with a water-base ink, particularly a recording medium for full color ink jet recording having a gloss.

U.S. Pat. No. 4,741,969 (Hayama et al.), the disclosure of which is totally incorporated herein by reference, discloses an aqueous ink recording sheet which is prepared by coating on the surface of a substrate sheet a resin composition containing as the chief ingredient a mixture comprising (A) 10 to 90 weight percent of photopolymerizable, double bonded anionic synthetic resin, and (B) 90 to 0 weight percent of partially or completely saponified polyvinyl alcohol, or partially or completely saponified polymer resin composed of 20 to 100 weight percent of vinyl acetate and 80 to 0 weight percent of other polymerizable monomer or derivatives thereof, and/or (C) 90 to 0 weight percent of homopolymer resin of N-vinylpyrrolidone or copolymer resin of other polymerizable monomer therewith, with the weight ratio of (A)/((B)+(C)) being 90/10 to 10/90, drying the coated resin composition, and then curing the resin composition by the irradiation with actinic rays so as to form a resin coating layer on the substrate. The aqueous ink recording sheet is not only capable of recording distinctly and sharply the multicolor full color copy that is an advantageous point in ink jet process but also excellent in both the adsorbency and the dryness against the ink.

U.S. Pat. No. 4,734,336 (Oliver et al.), the disclosure of which is totally incorporated herein by reference, discloses a twin ply uncoated paper for ink jet processes comprising a supporting paper substrate sheet as a first ply, and thereover as a second ply a paper sheet with filler additives attached to the fibers thereof, which additives are, for example, selected from the group consisting of amorphous synthetic silicas, inorganic silicates, metal alumino-silicates, and inorganic oxides. Three ply papers are also illustrated wherein there is situated between two second plies a supporting substrate sheet.

U.S. Pat. No. 4,705,719 (Yamanaka et al.), the disclosure of which is totally incorporated herein by reference, discloses synthetic paper of multilayer resin films comprising a base layer (1a) constituted by a biaxially stretched film made of the thermoplastic resin, and a laminate provided onto at least one of opposite surfaces of said base layer, said laminate including a paper-like layer (1b) and a surface layer (1c), said paper-like layer being constituted by a uniaxially stretched film made of a thermoplastic resin containing 8 to 65 percent by weight of inorganic fine powder, said surface layer being constituted by a uniaxially stretched film made of a thermoplastic resin, said surface layer having a thickness t satisfying the following expression $R \geq t \geq (1/10) \times R$ in which R represents an average particle diameter of said inorganic fine powder existing in the paper-like layer. The synthetic paper is superior in paper supply property, in printability, in dryness of offset ink, and in surface strength and it is substantially free from paper dust trouble.

U.S. Pat. No. 4,663,216 (Toyoda et al.), the disclosure of which is totally incorporated herein by reference, discloses a synthetic paper printable in high gloss comprises (1) a multilayer support, (2) a layer of a transparent film of a thermoplastic resin free from an inorganic fine powder formed on one surface of the support (1), and (3) a primer layer of a specific material. The support (1) comprises (1a) a base layer of a biaxially stretched film of a thermoplastic resin and a surface and a back layer (1b) and (1c) composed of a monoaxially stretched film of a thermoplastic resin containing from 8 to 65 percent by weight of an inorganic fine powder.

U.S. Pat. No. 4,500,607 (Louden et al.), the disclosure of which is totally incorporated herein by reference, discloses a paper which resists significant distortion in planarity in response to moisture which comprises a web which carries a predetermined amount of a polymer-filler blend and which has been dried after application of said blend to a finished moisture level below about 4 percent by weight.

While known compositions and processes are suitable for their intended purposes, a need remains for improved recording substrates suitable for use in ink jet printing processes. In addition, a need remains for improved recording substrates suitable for use in hot melt ink jet printing processes. Further, a need remains for improved recording substrates suitable for use in acoustic ink jet printing processes. Additionally, a need remains for recording substrates that, when used in hot melt ink jet printing processes and aqueous ink jet printing processes, enable the generation of images with good waterfastness. There is also a need for recording substrates that, when used in hot melt ink jet printing processes and aqueous ink jet printing processes, enable the generation of images with good lightfastness. In addition, there is a need for recording substrates that, when used in hot melt ink jet printing processes and aqueous ink jet printing processes, enable the generation of images with good optical density. Further, there is a need for recording substrates that, when used in hot melt ink jet printing processes and aqueous ink jet printing processes, enable the generation of images with low edge raggedness. Additionally, there is a need for recording substrates that, when used in hot melt ink jet printing processes and aqueous ink jet printing processes, enable the generation of images with low intercolor bleed. A need also remains for recording substrates that, when used in hot melt ink jet printing processes, enable the generation of glossy images with a look and feel simulating those obtained with silver halide technology. In addition, a need remains for recording substrates that, when used in hot melt ink jet printing processes and aqueous ink jet printing processes, avoid or minimize problems associated with the feeding of the substrates through the paper path of the printing apparatus. Further, a need remains for recording substrates that, when used in hot melt ink jet printing processes and aqueous ink jet printing processes, enable the generation of images with minimum showthrough. Additionally, a need remains for recording substrates that, when used in aqueous ink jet printing processes, enable the generation of images with reduced curling of the substrate. There is also a need for recording substrates that, when used in hot melt ink jet printing processes and aqueous ink jet printing processes, enable the generation of images with good scratch resistance.

SUMMARY OF THE INVENTION

The present invention is directed to a recording substrate which comprises (a) a cellulosic substrate having a first surface and a second surface opposite the first surface; (b) on the first surface of the cellulosic substrate and in contact therewith, a first coating comprising (i) an extrudable polyester, (ii) a plasticizer, and (iii) an antistatic agent; (c) on the first surface of the cellulosic substrate and in contact with the first coating, a second coating comprising (i) a hydrophilic binder, (ii) an ink wetting agent, (iii) a lightfastness-imparting agent, (iv) a cationic dye mordant, (v) a filler, and (vi) an optional biocide; and (d) on the second surface of the cellulosic substrate and in contact therewith, a third coating comprising (i) an extrudable alkylene polymer, (ii) an antistatic agent, (iii) a lightfastness-imparting agent, (iv) a plasticizer, and (v) a filler. Another embodiment of the present invention is directed to a printing process which comprises incorporating an ink into an ink jet printing apparatus and causing droplets of the ink to be ejected in an imagewise pattern onto a recording substrate of the present invention. In one specific embodiment, the printing apparatus employs an acoustic ink jet process, wherein droplets of the ink are caused to be ejected in imagewise pattern by acoustic beams. In another specific embodiment, the printing apparatus employs a hot melt ink jet process, wherein a solid ink is incorporated into the printing apparatus, and wherein the process comprises melting the ink and causing droplets of the melted ink to be ejected in an imagewise pattern onto the recording substrate.

DETAILED DESCRIPTION OF THE INVENTION

The recording substrates of the present invention comprise a cellulosic substrate or base sheet having coatings on both lateral surfaces thereof. Any suitable substrate can be employed, such as sized blends of hardwood kraft and softwood kraft fibers, which blends typically contain from about 10 percent to 90 percent by weight of softwood and from about 90 to about 10 percent by weight of hardwood. Examples of hardwood include Seagull W dry bleached hardwood kraft, preferably present, for example, in one embodiment in an amount of about 70 percent by weight. Examples of softwood include La Tuque dry bleached softwood kraft present, for example, in one embodiment in an amount of about 30 percent by weight. These sized substrates can also contain pigments in typical amounts of from about 1 to about 60 percent by weight, such as clay (available from Georgia Kaolin Company, Astro-fil 90 clay, Engelhard Ansilex clay), titanium dioxide (available from Tioxide Company as Anatase grade AHR), calcium silicate CH-427-97-8, XP-974 (J. M. Huber Corporation), and the like. The sized substrates can also contain various effective amounts of sizing chemicals (for example from about 0.25 percent to about 25 percent by weight of pulp), such as Mon size (available from Monsanto Company), Hercon-76 (available from Hercules Company), Alum (available from Allied Chemicals as Iron free alum), and retention aid (available from Allied Colloids as Percol 292). The sizing values of the base papers typically are at least about 0.4 second, and typically are no more than about 4,685 seconds; papers with sizing degrees of at least about 200 seconds and with sizing degrees of no more than about 1,000 seconds are preferred, primarily to avoid penetration of the coatings into the bulk of paper substrate and to maintain costs. The porosity values of the substrates typically are at least about 50 milliliters per minute, and preferably at least about 50 milliliters per minute, and typically are no more than about 600 milliliters per minute, and preferably no more than about 200 milliliters per minute, although the porosity value can be outside of these ranges. The cellulosic substrate typically has a thickness of at least about 50 microns, preferably at least about 90 microns, and more preferably at least about 100 microns, and typically has a thickness of no more than about 250 microns, preferably no more than about 175 microns, and more preferably no more than about 150 microns, although the thickness can be outside of these ranges.

Illustrative examples of commercially available internally and externally (surface) sized cellulosic substrates suitable for the present invention include diazo papers, offset papers such as Great Lakes offset, recycled papers such as Conservatree, office papers such as Automimeo, Eddy liquid toner paper and copy papers from companies such as Nekoosa, Champion, Wiggins Teape, Kymmene, Modo, Domtar, Veitsiluoto and Sanyo, and Xerox® 4024 papers and sized calcium silicate-clay filled papers, with the Xerox® 4024 papers being particularly preferred in view of their availability and low print through.

Situated on the first surface of the cellulosic substrate, and in contact with the cellulosic substrate, is a first coating. The first coating is of any desired or effective thickness. Typically, the total, thickness of the first coating layer is at least about 0.1 micron, and preferably at least about 5 microns, and typically is no more than about 10 microns, and preferably no more than about 5 microns, although the thickness can be outside of these ranges. This coating smoothens the paper and reduces its porosity to typical values of about 10 milliliters per minute, although the porosity can be greater or lesser than this value.

The first coating includes an extrudable polyester. By "extrudable" is meant a polymer that, when melt processed via extrusion at elevated temperatures not exceeding the degradation temperature of the polymer, the polymer is capable of forming a continuous film that, upon cooling, adheres to the substrate coated. The extrudable polyester is present in the first coating in any desired or effective amount, typically at least about 5 percent by weight of the first coating, and preferably at least about 50 percent by weight of the first coating, and typically no more than about 90 percent by weight of the first coating, although the amount can be outside of these ranges.

Examples of suitable extrudable polyesters include polyvinyl esters, including poly(vinyl stearate), such as #103 available from Scientific Polymer Products, poly(vinyl propionate), such as #303 available from Scientific Polymer Products, poly(vinyl pivalate), such as #306 available from Scientific Polymer Products, poly(vinyl neodecanoate), such as #267 available from Scientific Polymer Products, poly vinyl acetate, such as #346 and #347 available from Scientific Polymer Products, and the like; low melt polyesters, including poly(ethylene adipate), such as #147 available from Scientific Polymer Products, poly(ethylene succinate), such as #149 available from Scientific Polymer Products, poly(ethylene azelate), such as #842 available from Scientific Polymer Products, poly(1,4-butylene adipate), such as #150 available from Scientific Polymer Products, poly (trimethylene adipate), such as #594 available from Scientific Polymer Products, poly(trimethylene glutarate), such as #591 available from Scientific Polymer Products, poly (trimethylene succinate), such as #592 available from Scientific Polymer Products, poly(hexamethylene succinate), such as #124 available from Scientific Polymer Products, poly(diallyl phthalate), such as #010 available from Scientific Polymer Products, poly(diallyl isophthalate), such as #011 available from Scientific Polymer Products, poly (vinylidene chloride-co-methyl acrylate), such as #43,040-4 available from Aldrich Chemical Company, poly(vinylidene fluoride-co-hexafluoropropylene), such as #42,716-0 available from Aldrich Chemical Company, poly(chloro trifluoroethylene), such as #42,691-1 available from Aldrich Chemical Company, and polyesters such as polyethylene terephthalate (Vitel 5833); and the like, as well as blends or mixtures thereof.

The first coating also includes a plasticizer. The plasticizer is present in the first coating in any desired or effective amount, typically at least about 7 percent by weight of the first coating, and typically no more than about 70 percent by weight of the first coating, and preferably no more than about 30 percent by weight of the first coating, although the amount can be outside of these ranges. Preferably, the plasticizer has a melting point of less than about 75° C.

Examples of suitable plasticizers include (a) allyl compounds, such as (1) allyl acetoacetate (Aldrich 25,495-9), (2) N-allyl aniline (Aldrich A2,900-3), (3) 4-allyl anisole (Aldrich A2,920-8), (4) allyl benzene (Aldrich A2,940-2), (5) N-allyl cyclopentylamine (Aldrich 37,401-6), (6) allyl diethyl phosphonoacetate (Aldrich 40,570-1), (7) 4-allyl-1,2-dimethoxybenzene (Aldrich 28,442-4), (8) 4-allyl-2,6-dimethoxyphenol (Aldrich A3,160-1), (9) allyl diphenylphosphine (Aldrich 33,687-4), (10) allyl alcohol propoxylate (Aldrich 43,037-4), (11) tert-butyl N-allyl carbamate (Aldrich 42,233-9), (12) allyl-6-methylphenol (Aldrich A3,400-7), (13) 2-allylphenol (Aldrich A3,480-5),

(14) allyl phenyl ether (Aldrich A3,520-8), (15) allyl phenyl sulfone (Aldrich 31,771-3), (16) 3-allyl rhodanine (Aldrich AX3,560-7), (b) bromoalcohols, such as (1) 4-bromobenzyl alcohol (Aldrich 18,705-4), (2) 2-bromo-α-methylbenzyl alcohol (Aldrich 42,979-1), (3) 5-bromo-2-methoxybenzyl alcohol (Aldrich 18,969-3), (4) 2-bromo-α-methylbenzyl alcohol (Aldrich 32,724-7), (5) 2-(bromoethyl)-2-(hydroxymethyl)- ,1,3-propanediol (Aldrich 38,017-2), and the like, as well as mixtures thereof.

The first coating also includes an antistatic agent. The antistatic agent is present in the first coating in any desired or effective amount, typically at least about 3 percent by weight of the first coating, and typically no more than about 25 percent by weight of the first coating, and preferably no more than about 20 percent by weight of the first coating, although the amount can be outside of these ranges.

Examples of suitable antistatic agents include (a) anionic materials, such as (1) dodecylbenzene sulfonates, such as calcium dodecylbenzene sulfonate (Rhodacal 70/B), branched isopropylamine dodecylbenzene sulfonate (Rhodacal 330), and sodium dodecylbenzene sulfonate (Rhodacal DS-10), (2) sodium alpha-olefin sulfonate (Rhodacal 301-10), (3) disodium dodecyl diphenyl oxide disulfonate (Rhodacal DSB), (4) naphthalene sulfonates, such as sodium diisopropyl naphthalene sulfonate (Supragil WP), sodium dibutyl naphthalene sulfonate (Supragil NK), and sodium naphthalene formaldehyde sulfonate (Supragil NS/90), (4) sulfosuccinates, such as disodium lauryl sulfosuccinate (Geropon LSS), sodium dioctyl sulfosuccinate (Geropon SS-O-75), and sodium dinonyl sulfosuccinate (Geropon WS-25), (5) disodium N-alkyl-sulfosuccinamate (Geropon FA-82), (6) sodium oleyl N-methyl taurate (Geropon T-51), (7) sodium cocoyl isethionate (Geropon AC-270), and (8) organic phosphate esters (Rhodafac), all available from Rhone-Poulenc; (b) cationic materials, including low melt quaternary salts, such as (1) benzyl dimethyl tetradecyl ammonium chloride dihydrate (melting point 63 to 65° C.; Aldrich 29,279-6), (2) benzyl dimethyl stearyl ammonium chloride monohydrate (melting point 67 to 69° C.; Aldrich 22,901-6), (3) cetyl pyridinium bromide monohydrate (melting point 66 to 68° C.; Aldrich 28,531-5), (4) dodecyl pyridinium chloride monohydrate (melting point 66 to 70° C.; Aldrich 27,860-2), (5) hexadecyl tributyl phosphonium bromide (melting point 57 to 60° C.; Aldrich 27,620-0), (6) 1,12-diaminododecane (melting point 69° C.; Aldrich D1,640-1), (7) stearyl tributyl phosphonium bromide (melting point 70° C.; Aldrich 29,303-2), (8) benzyl dodecyl dimethyl ammonium bromide (melting point 46 to 48° C.; Aldrich 28,088-7), (9) tetrabutyl ammonium chloride hydrate (melting point 44° C.; Aldrich #34,585-7), and the like, as well as mixtures thereof.

Situated on the first coating, and in contact with the first coating, is a second coating for receiving ink images. The second coating is present on the first coating in any desired or effective thickness, typically at least about 0.1 micron, and preferably at least about 0.5 micron, and typically no more than about 25 microns, and preferably no more than about 10 microns, although the thickness can be outside of these ranges.

The second coating includes a hydrophilic binder. The hydrophilic binder is present in the second coating in any desired or effective amount typically at least about 5 percent by weight of the second coating, and preferably at least about 16 percent by weight of the second coating, and typically no more than about 70 percent by weight of the second coating, and preferably no more than about 70 percent by weight of the second coating, although the amount can be outside of these ranges.

Examples of suitable hydrophilic binders include (a) hydrophilic polysaccharides and modifications thereof, such as (1) alkyl, aryl, alkylaryl, and arylalkyl celluloses, wherein the alkyl, aryl, alkylaryl, or arylalkyl group has at least one carbon atom and wherein the number of carbon atoms is such that the material is water soluble, preferably from 1 to about 24 carbon atoms, more preferably from 1 to about 10 carbon atoms, and even more preferably from 1 to about 7 carbon atoms, such as methyl, ethyl, propyl, butyl, pentyl, hexyl, phenyl, benzyl, and the like, such as methyl cellulose (Methocel AM 4 and Methocel A, available from Dow Chemical Company), (2) hydroxyalkyl, hydroxyalkylaryl, and hydroxyarylalkyl celluloses, wherein the alkyl, alkylaryl, or arylalkyl group has at least one carbon atom and wherein the number of carbon atoms is such that the material is water soluble, preferably from 1 to about 20 carbon atoms, and more preferably from 1 to about 10 carbon atoms, such as methyl, ethyl, propyl, butyl, pentyl, hexyl, benzyl, or the like, such as hydroxyethyl cellulose (Natrosol 250 LR, available from Hercules Chemical Company) and hydroxypropyl cellulose (Klucel Type E, available from Hercules Chemical Company), (3) alkyl hydroxy alkyl, alkyl hydroxy arylalkyl, alkyl hydroxy alkylaryl, arylalkyl hydroxy ,alkyl, arylalkyl hydroxy arylalkyl, arylalkyl hydroxy alkylaryl, alkylaryl hydroxy alkyl, alkylaryl hydroxy arylalkyl, and alkylaryl hydroxy alkyl celluloses, wherein each alkyl, arylalkyl, or alkylaryl group has at least one carbon atom and wherein the number of carbon atoms is such that the material is water soluble, preferably from 1 to about 20 carbon atoms, and more preferably from 1 to about 10carbon atoms, such as methyl, ethyl, propyl, butyl, pentyl, hexyl, benzyl, or the like, such as ethyl hydroxyethyl cellulose (Bermocoll, available from Berol Kem. A. B. Sweden), (4) hydroxyalkyl alkyl celluloses, wherein each alkyl group has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl, and the like, such as hydroxyethyl methyl cellulose (HEM, available from British Celanese Ltd., also available as Tylose MH, MHK from Kalle A. G.), hydroxypropyl methyl cellulose (Methocel K35LV, available from Dow Chemical Company), and hydroxybutyl methyl cellulose (such as HBMC, available from Dow Chemical Company), (5) dihydroxyalkyl celluloses, wherein the alkyl group has at least one carbon atom and wherein the number of carbon atoms is such that the material is water soluble, preferably from 1 to about 20 carbon atoms, and more preferably from 1 to about 10 carbon atoms, such as methyl, ethyl, propyl, butyl, and the like (such as dihydroxypropyl cellulose, which can be prepared by the reaction of 3-chloro-1,2-propane with alkali cellulose), (6) hydroxy alkyl hydroxy alkyl celluloses, wherein each alkyl group has at least one carbon atom and wherein the number of carbon atoms is such that the material is water soluble, preferably from 1 to about 20 carbon atoms, and more preferably from 1 to about 10 carbon atoms, such as methyl, ethyl, propyl, butyl, and the like (such as hydroxypropyl hydroxyethyl cellulose, available from Aqualon Company), (7) dialkylammonium halide hydroxy alkyl celluloses, wherein each alkyl group has at least one carbon atom and wherein the number of carbon atoms is such that the material is water soluble, preferably from 1 to about 20 carbon atoms, and more preferably from 1 to about 10 carbon atoms, such as methyl, ethyl, propyl, butyl, and the like, and wherein halide is a halogen atom (such as diethylammonium chloride hydroxy ethyl cellulose, available as Celquat H-100, L-200, National Starch and Chemical Company), (8) hydroxyalkyl trialkyl ammonium halide hydroxyalkyl celluloses, wherein each alkyl group has at least one carbon atom and wherein the number of carbon atoms is such that the material is water soluble, preferably from 1 to about 20 carbon atoms, and more preferably from 1 to about 10 carbon atoms, such as methyl, ethyl, propyl, butyl, and the like, and wherein halide is a halogen atom (such as hydroxypropyl trimethyl ammonium chloride hydroxyethyl cellulose, available from Union Carbide Company as Polymer JR), (9) carboxyalkyl dextrans, wherein the alkyl group has at least one carbon atom and wherein the number of carbon atoms is such that the material is water soluble, preferably from 1 to about 20 carbon atoms, and more preferably from 1 to about 10 carbon atoms, such as methyl, ethyl, propyl, butyl, pentyl, hexyl, and the like (such as carboxymethyl dextrans, available from Poly Sciences Inc. as #16058), (10) carboxy alkyl cellulose salts, wherein the alkyl group has at least one carbon atom and wherein the number of carbon atoms is such that the material is water soluble, preferably from 1 to about 20 carbon atoms, and more preferably from 1 to about 10 carbon atoms, such as methyl, ethyl, propyl, butyl, and the like, and wherein the cation is any conventional cation, such as sodium, lithium, potassium, calcium, magnesium, or the like (such as sodium carboxymethyl cellulose CMC 7HOF, available from Hercules Chemical Company), (11) starch (such as starch SLS-280, available from St. Lawrence Starch), (12) cationic starch (such as Cato-72, available from National Starch and Chemical Company), (13) hydroxyalkyl starch, wherein the alkyl group has at least one carbon atom and wherein the number of carbon atoms is such that the material is water soluble, typically from 1 to about 20 carbon atoms, and preferably from 1 to about 10 carbon atoms, although the number of carbon atoms can be outside of these ranges, such as methyl, ethyl, propyl, butyl, or the like (such as hydroxypropyl starch (#02382 available from Poly Sciences Inc.) and hydroxyethyl starch (#06733 available from Poly Sciences Inc.), (14) gelatin (such as Calfskin gelatin #00639 available from Poly Sciences Inc.), (15) halodeoxycellulose, wherein halo represents a halogen atom (such as chlorodeoxycellulose, which can be prepared by the reaction of cellulose with sulfuryl chloride in pyridine at 25° C.), (16) amino deoxycellulose (which can be prepared by the reaction of chlorodeoxy cellulose with 19 percent alcoholic solution of ammonia for 6 hours at 160° C.), (17) dialkyl amino alkyl cellulose, wherein each alkyl group has at least one carbon atom and wherein the number of carbon atoms is such that the material is water soluble, typically from 1 to about 20 carbon atoms, and preferably from 1 to about 10 carbon atoms, such as methyl, ethyl, propyl, butyl, and the like (such as diethyl amino ethyl cellulose, available from Poly Sciences Inc. as DEAE cellulose #05178), (18) dialkyl ammonium hydrolyzed collagen protein, wherein each alkyl group has at least one carbon atom and wherein the number of carbon atoms is such that the component is water soluble, preferably from1 to about 20 carbon atoms, more preferably from 1 to about 10 carbon atoms, such as methyl, ethyl, propyl, butyl, and the like (such as dimethyl ammonium hydrolyzed collagen protein, available from Croda as Croquats), (19) gum arabic (such as #G9752 available from Sigma Chemical Company), (20) carrageenan (such as #C1013 available from Sigma Chemical Company), (21) Karaya gum (such as #G0503 available from Sigma Chemical Company), (22) xanthan (such as Keltrol-T, available from Kelco division of Merck and Company), (23) carboxy alkyl hydroxyalkyl guar, wherein each alkyl group has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl, and the like (such as carboxymethyl hydroxypropyl guar, available from Auqualon Company), (24) cationic guar (such as Celanese Jaguars C-14-S, C-15, and C-17 available from Celanese Chemical Company), and the like; (b) vinyl polymers, such as (1) poly(vinyl alcohol) (such as Elvanol, available from Dupont Chemical Company), (2) poly (vinyl phosphate) (such as #4391, available from Poly Sciences Inc.), (3) poly(vinyl pyrrolidone) (such as PVP K-15, PVP K-30, PVP K-60, PVP K-90, IGUAFEN A, PLASDONE K-25, PLASDONE K-26/28, PLASDONE K-29/32, PLASDONE C-15, PLASDONE C-30, PLASDONE XL, available from GAF Corporation), (4) vinyl pyrrolidone-vinyl acetate copolymers (such as #02587, available from Poly Sciences Inc.), (5) vinyl pyrrolidone-styrene copolymers (such as #371, available from Scientific Polymer Products), (6) poly(vinylamine) (such as #1562, available from Poly Sciences Inc.), (7) poly(vinyl alcohol) alkoxylated, wherein the alkoxy group has at least one carbon atom and wherein the number of carbon atoms is such that the material is water soluble, preferably from 1 to about 20 carbon atoms, and more preferably from 1 to about 10 carbon atoms, such as methoxy, ethoxy, propoxy, butoxy, and the like (such as poly(vinyl alcohol) ethoxylated #6573, available from Poly Sciences Inc.), and (8) poly(vinyl pyrrolidone-dialkylaminoalkyl alkylacrylate)s, wherein each alkyl group has at least one carbon atom and wherein the number of carbon atoms is such that the material is water soluble, preferably from 1 to about 20 carbon atoms, and more preferably from 1 to about 10 carbon atoms, such as methyl, ethyl, propyl, butyl, and the like (such as poly(vinyl pyrrolidone-diethylaminomethylmethacrylate) #16294 and #16295, available from Poly Sciences Inc.); (c) acrylamide containing polymers, such as (1) poly (acrylamide) (such as #02806, available from Poly Sciences Inc.), (2) acrylamide-acrylic acid copolymers (such as #04652, #02220, and #18545, available from Poly Sciences Inc.), (3) poly (acrylamide-co-diallyldimethylammonium chloride) (such as 40,908-1, available from Aldrich Chemical Company), and (3) poly(N,N-dimethyl acrylamide) (such as #004590, available from Poly Sciences Inc.); and the like, as well as mixtures thereof.

The second coating also includes an ink wetting agent. The ink wetting agent is present in the first coating in any desired or effective amount, typically at least about 2 percent by weight of the second coating, and preferably at least about 4 percent by weight of the second coating, and typically no more than about 45 percent by weight of the second coating, and preferably no more than about 40 percent by weight of the second coating, although the amount can be outside of these ranges.

Examples of suitable ink wetting agents include oxyalkylene-containing polymers, such as poly (oxy methylene), such as #009, available from Scientific Polymer Products, poly (oxyethylene) or poly (ethylene oxide), such as POLY OX WSRN-3000, available from Union Carbide Corporation, ethylene oxide/propylene oxide copolymers, such as ethylene oxide/propylene oxide/ethylene oxide triblock copolymer, such as Alkatronic EGE-31-1, available from Alkaril Chemicals, propylene oxide/ethylene oxide/ propylene oxide triblock copolymers, such as Alkatronic PGP 3B-1, available from Alkaril Chemicals, tetrafunctional block copolymers derived from the sequential addition of ethylene oxide and propylene oxide to ethylene diamine, the content of ethylene oxide in these block copolymers being from about 5 to about 95 percent by weight, such as Tetronic 50R8, available from BASF Corporation, epichlorohydrin-ethyleneoxide copolymers, such as #155 available from Scientific Polymer Products, and the like. Examples of ink wetting agents derived from alcohols include trimethylolpropone (Aldrich 23,974-7), trimethylolpropane ethoxylate (Aldrich 40,977-4; Aldrich 40,978-2; Aldrich 41,616-9; Aldrich 41,617-7), trimethylolpropane triacrylote (Aldrich 24,680-8), trimethylolpropane trimethacrylate (Aldrich 24,684-0), trimethylolpropane ethoxylate triacrylate (Aldrich 41,2177-1; 41,219-8), trimethylolpropane propoxylate triacrylate (Aldrich 40,756-9; 40,757-7), trimethylolpropane ethoxylate methylether diacrylate (Aldrich 40,587-1), trimethylolpropane tris (2-methyl-1-aziridine propionate) (Aldrich 40,544-2), neopentyl glycol ethoxylate (Aldrich 41,027-6), neoplentyl glycol propoxylate (Aldrich 40,987-1; Aldrich 41,214-7), glycerol, propoxylate (Aldrich 37,389-3; Aldrich 37,390-7; Aldrich 37,391-5; Aldrich 37,392-3; Aldrich 37,396-6; Aldrich 41,028-4), glycerol propoxylate-b-ethoxylate triol (Aldrich 37,386-9; Aldrich 37,387-7; Aldrich 37,388-5), glycerol ethoxylate-b-propoxylate triol (Aldrich 40,918-9), pentaerythritol ethoxylate (Aldrich 41,615-0; 41,873-0), pentoerythritol propoxylate (Aldrich 41,874-9; 41,875-7), pentaerythritol propoxylate/ethoxylate (Aldrich 42,502-8), triethanol amine ethoxylate (Aldrich 41,658-4), N-methyl diethanolamine (Aldrich M4,220-3), N-ethyl diethanolamine (Aldrich 11,206-2), N-butyl diethanolamine (Aldrich 12,425-7), N-phenyl diethanolamine (Aldrich P2,240-0), triethanol amine (Aldrich T5,830-0), trioctylamine (Aldrich T8,100-0), 4-xylylene diamine (Aldrich 27,963-3), 1,4-bis(2-hydroxyethoxy)-2-butyne (Aldrich B4,470-8), pantothenol (Aldrich 29,578-7), 1-phenyl-1,2-ethanediol (Aldrich 30,215-5; P2,405-5), 3-ethoxy-1,2-propanediol (Aldrich 26,040-1), 3-allyloxy-1,2-propanediol (Aldrich 25,173-9), 3-ethoxy-1,2-propanediol (Aldrich 26,042-8), 3-phenoxy-1,2-propanediol (Aldrich 25,781-8), 3-octadecyloxy- 1,2-propanediol (Aldrich B40-2), 3-(4-methoxy phenoxy)-1,2-propanediol (Aldrich 21,024-2), Mephensin (3-(2-methyl phenoxy)-1,2-propanediol) (Aldrich 28,656-7), 3-diethylamino)-1,2-propanediol (Aldrich 21,849-9), 2-phenyl-1,2-propanediol (Aldrich 21,376-4), 3-amino-1,2-propanediol (Aldrich A7,600-1), 3-(diisopropyl amino)-1,2-propanediol (Aldrich 25,766-4), 3-(N-benzyl-N-methylamino)-1,2-propanediol (Aldrich 21,850-2), 3-pyrrolidino-1,2-propanediol (Aldrich 21,851-0), 3-piperidino-1,2-propanediol (Aldrich 21,849-9), 3-morpholino-1,2-propanediol (Aldrich 21,848-0), 2.2-dimethyl-1-phenyl-1,3-propanediol (Aldrich 40,873-5), 2-benzyloxy-1,3-propanediol (Aldrich 36,744-3), 4-8-bis (hydroxymethyl) tricyclo(5.2.1.02.6)decane (Aldrich B4,590-9), 1-(N,N-bis (2-hydroxyethyl) isopropanolamine (Aldrich 23,375-7), 3N,N-bis(2-hydroxypropyl) ethanolamine (Karl-lndustries), 1-(2-(2-hydroxyethoxy)ethyl)-piperazine (Aldrich 33,126-0), 1-4-bis(2-hydroxy ethyl) piperazine (Aldrich B4,540-2), homovanillyl alcohol (Aldrich 14,883-0), phenethyl alcohol (Aldrich P1,360-6), 3,6-dimethyl-4-octyne-3,6-diol (Aldrich 27,840-8), 2-(hydroxymethyl)-1,3-propanediol (Aldrich 39,365-7), 2-butyl-2-ethyl-1,3-propanediol (Aldrich 14,247-6), 2-piperidine methanol (Aldrich 15,522-5), 2,2,4-trimethyl-1,3-pentanediol (Aldrich 32,722-0), Vitamin E (Aldrich 25,802-4), Vitamin E acetate (Aldrich 24,817-7), Vitamin K (Aldrich 28,740-7), tri(ethylene glycol)dimethylacrylate (Aldrich 26,154-8), triethyl citrate (Aldrich 10,929-0), 2,4,7,9-tetramethyl-5-decyne-4,7-diol (Aldrich 27,838-6); and the like, as well as mixtures thereof. Examples of ink wetting agents derived from surfactants include (1) hydrophilic poly(dimethyl siloxanes), such as (a) poly(dimethyl siloxane) monocarbinol terminated (PS558, Petrarch Systems Inc.) and dicarbinol terminated (PS555, PS556, Petrarch Systems Inc.), (b) poly(dimethyl siloxane)-b-poly (methyl siloxane alkylene oxide) copolymers (PS073, PS072, PS071, Petrarch Systems Inc.), Alkasil HEP 182–280, Alkasil HEP 148-330, Alkaril Chemicals, non-hydrolyzable copolymers containing S1-C linkages, (c) poly (dimethylsiloxane)-b-poly(propyleneoxide)-b-poly (ethylene oxide) copolymers (Alkasil NEP 73-70, Alkaril Chemicals), hydrolyzable copolymer containing S1-O-C linkages, and (d) polyquaternary poly(dimethyl siloxane) copolymers (which can be obtained by the addition reaction of α-hydrogen polysiloxane with epoxides containing olefinic bonds and then reacting the product with a diamine); (2) poly(alkylene glycol) and its derivatives, such as (a) poly(propylene glycol) (Alkapol PPG-425, Alkapol PPG-4000, Alkaril Chemicals), (b) poly(propylene glycol dimethacrylate), poly(ethylene glycol diacrylate), poly (ethylene glycol dimethacrylate), polyethylene glycol monomethyl ether), poly(ethylene glycol dimethyl ether), poly(ethylene glycol diglycidyl ether) (all from Polysciences), and (c) poly(1,4-oxybutylene glycol) (Scientific Polymer Products); (3) copolymers of lipophilic poly(propylene oxide) with hydrophilic poly(ethylene oxide), such as (a) methanol soluble-Tetronic 150R1, Pluronic L-101, Tetronic 902, Tetronic 25R2 (BASF Corporation), Alkatronic EGE-1 (Alkaril Chemicals), and (b) water soluble-Tetronic 908, 50R8, 25R8, 904, 90R4, Pluronic F-77, all from BASF Corporation, and Alkatronic EGE 25-2 and PGP 33-8 from Alkaril Chemicals; (4) fatty ester modifications of (a) phosphates (Alkaphos B6-56A, Alkaril Chemicals), (b) sorbitan (Alkamuls SMO (sorbitan trioleate), Alkamuls SML (sorbitan mono laurate), Alkamuls SMO (sorbitan monooleate), Alkaril Chemicals), (c) glycerols (Alkamuls GMO-45LG (glyceryl mono oleate), Alkamuls GDO (glyceryl dioleate), Alkamuls GTO (glyceryl trioleate)), (d) poly(ethylene glycols) (Alkamuls 600 DO (di oleate), Alkamuls 400-ML (mono laurate), Alkamuls 600 MO (mono oleate), Alkamuls 600 DL (dilaurate), Alkamuls 600 DT (ditallow), Alkaril Chemicals), (e) sulfosuccinic acid (Alkasurf SS-O-75 (sodium dioctyl sulfosuccinate), Alkasurf SS-DA4-HE (ethoxylated alcohol sulfosuccinate), Alkasurf SS-L7DE (sodium sulfosuccinate ester of lauric diethanol amide), Alkasurf SS-L-HE (sodium lauryl sulfosuccinate), Alkaril Chemicals), (f) sulfonic acid (Alkasurf CA, (calcium dodecyl benzene sulfonate), Alkasurf 1PAM (isopropylamine dodecyl benzene sulfonate), Alkaril Chemicals), and (g) alkyl amines (Alkamide SDO (soya diethanol amide), Alkamide CDE (coco diethanol amide), Alkamide CME (coco monoethanol amide), Alkamide L9DE (lauric diethanol amide), Alkamide L7Me (lauric monoethanol amide), Alkamide L1PA (lauric monoisopropylamide), Alkaril Chemicals); (5) poly (oxyalkylene) modifications of (a) sorbitan esters (Alkamuls PSML-4 (poly(oxyethylene) sorbitan monolaurate), Alkamuls PSMO-20 (poly(oxyethylene) sorbitan monooleate), Alkamuls PSTO-20 (poly(oxyethylene) sorbitan trioleate), Alkaril Chemicals), (b) fatty amines (Alkaminox T-2, T-5 (tallow amine ethoxylate), Alkaminox SO-5 (soya amine ethoxylate), Alkaril Chemicals), (Icomeen T-2, Icomeen T-15, ICI Chemicals), (c) castor oil (Alkasurf CO-10 (caster oil ethoxylates), Alkaril Chemicals), (d) alkanol amide (Alkamide C-2, C-5 (coconut oil alkanolamide ethoxylates), Alkaril Chemicals), (e) fatty acid (Alkasurf 075-9, Alkasurf 0#-10 (oleic acid ethoxylates), Alkasurf L-14 (lauric acid ethoxylate), Alkasurf P-7 (palmitic acid ethoxylate)), and (f) fatty alcohol (Alkasurf LAN-1, LAN-3 Alkasurf TDA-6, Alkasurf SA-2, (linear alcohol ethoxylates), Alkasurf NP-1, NP-1 (nonyl phenol ethoxylates), Alkasurf OPÛ1, OP-12 (octyl phenol ethoxylates), Alkasurf LAEP-15, Alkasurf LAEP-25, Alkasurf LAEP-65 (linear alcohol alkoxylates)); (6) quaternary compounds, such as (a) nonpolymeric quaternary ammonium ethosulfate (Finquat CT, Cordex AT-172, Finetex Corporation), (b) quaternary dialkyl dimethyl methosulfate (Alkaquat DHTS (hydrogenated tallow)), (c) alkoxylated difatty methosulfate quaternary (Alkasurf DAET (tallow derivative)), and (d) fatty imidazoline methosulfate quaternary (Alkaquat T (tallow derivatives), Alkaril Chemicals); (7) fatty imidazolines and their derivatives, such as (a) Alkazine 0 (oleic derivative), (b) Alkazine TO (tail oil derivatives), (c) Alkateric 2CIB (dicarboxylic cocoimidazoline sodium salt), Alkaril Chemicals, and (d) Arzoline-4, (e) Arzoline-215, Baker Chemicals; and the like, as well as mixtures thereof.

The second coating also includes a lightfastness-imparting agent. The lightfastness-imparting agent is present in the second coating in any desired or effective amount, typically at least about 1 percent by weight of the second coating, and preferably at least about 2 percent by weight of the second coating, and typically no more than about 12 percent by weight of the second coating, and preferably no more than about 10 percent by weight of the second coating, although the amount can be outside of these ranges.

Examples of suitable lightfastness-imparting agents include UV absorbing compounds, such as glycerol ρ-amino benzoate, available as Escalol 106 from Van Dyk Corporation; resorcinol mono benzoate, available as RBM from Eastman Chemicals; octyl dimethyl amino benzoate, available as Escalol 507 from Van Dyk Corporation; hexadecyl 3,5-di-tert-butyl-4-hydroxy-benzoate, available as Cyasorb UV-2908 and as 41,320-8 from Aldrich Chemical Company; octyl salicylate, available as Escalol 106 from Van Dyk Corporation; octyl methoxy cinnamate, available as Parasol MCX from Givaudan Corporation; 4-allyloxy-2-hydroxybenzophenone, available as Uvinul 600 and as 41,583-9 from Aldrich Chemical Company; 2-hydroxy-4-methoxy benzophenone, available as Anti UVA from Acto Corporation; 2,2'-dihydroxy-4,4'-dimethoxy benzophenone, available as Uvinul D 49 and as D11,100-7 from Aldrich Chemical Company; 2-hydroxy-4-(octyloxy)benzophenone, available as Cyasorb UV531 and as 41,315-1 from Aldrich Chemical Company; 2-hydroxy-4-dodecyloxy benzophenone, available as DOBP from Eastman Chemicals; 2-(2'-hydroxy-5'-methylphenyl)benzotriazole, available as Tinuvin 900 from Ciba Geigy Corporation; 2-(2'-hydroxy-3,5-di-(1,1-dimethyl benzyl)phenyl)-2H-benzotriazole, available as Topanex 100BT from ICI America Corporation; bis(2-hydroxy-5-tert-octyl-3-(benzotriazol-2-yl)) phenyl methane, available as Mixxim BB/100 from Fairmount Corporation; 2-(3', 5'-di-tert-butyl-2'-hydroxyphenyl)-5-chlorobenzotriazole, available as Tinuvin 327 from Ciba Geigy Corporation; 2-(4-benzoyl-3-hydroxyphenoxy)ethylacrylate (available as Cyasorb UV-416 and as 41,321-6 from Aldrich Chemical Company); poly(2-(4-benzoyl-3-hydroxyphenoxy)ethylacrylate) (available as Cyasorb UV-2126 and as 41,323-2 from Aldrich Chemical Company); N-(p-ethoxycarbonyl phenyl)-N'-ethyl-N'-phenyl formadine, available as Givesorb UV-2 from Givaudan Corporation; 1,1-(1,2-ethane-diyl) bis(3,3,5, 5-tetramethyl piperazinone), available as Good-rite UV 3034 from Goodrich Chemicals; tris(3,5-di-tert-butyl-4-hydroxybenzyl)isocyanurate, available as Good-rite UV 3114 from Goodrich Chemicals; nickel bis(o-ethyl(3,5-di-feat-butyl-4-hydroxybenzyl) phosphonate), available as Irgastab 2002 from Ciba Geigy Corporation; (2,2,6,6-tetramethyl-4-piperidinyl)-1,2,3,4-butane tetracarboxylate), available as Mixxim HALS 57 from Fairmount Corporation; (2,2,6,6-tetramethyl-4-piperidinyl/β,β,β',β'-tetramethyl-3,9-(2,4,8,1O-tetraoxo spiro (5,5) undecane) diethyl)-1,2,3,4-butane tetracarboxylate, available as Mixxim HALS 68 from Fairmount Corporation; (1,2,2,6,6-pentamethyl-4-piperidinyl/βββ',β'-tetramethyl-3,9-(2,4,8,1O-tetra oxospiro (5,5) undecane) diethyl )-1,2,3,4-butane tetrdcarboxylate, available as Mixxim HALS 63 from Fairmount Corporation; 2-dodecyl-N-(2,2,6,6-tetramethyl-4-piperidinyl) succinimide, available as Cyasorb UV-3581 and as 41,317-8 from Aldrich Chemical Company; 2-dodecyl-N-(1,2,2,6,6-pentamethyl-4-piperidinyl) succinimide, available as Cyasorb UV-3604 and as 41,318-6 from Aldrich Chemical Company; N-(1-acetyl-2,2,6,6-tetramethyl-4-piperidinyl)-2-dodecyl succinimide, available as Cyasorb UV-3668 and as 41,319-4, from Aldrich Chemical Company; tetrasodium N-(1,2-dicarboxyethyl)-N-octadecyl sulfosuccinamate, available as Aerosol 22N from American Cyanamid Corporation; nickel dibutyidithiocarbamate, available as UV-Chek AM-105, from Ferro Corporation; poly(4-hydroxy-2,2,6,6-tetramethyl-1-piperidine ethanol/dimethyl succinic acid), available as Tinuvin 622LD from Ciba-Geigy; Corporation; poly(3,5-di-tert-butyl-4-hydroxy hydrocinnamic acid ester)/1,3,5-tris(2-hydroxyethyl)-5-triazine-2,4,6(1H,3H,5H)-trione, available as Good-rite 3125 from Goodrich Chemicals; poly(N,N-bis(2,2,6,6-tetramethyl-4-piperidinyl)-1,6-hexanediqmine-co-2,4-dichloro-6-morpholino-1,3,5-triazine), available as Cyasorb UV-3346 and as 41,324-0 from Aldrich Chemical Company; 1-(N-(poly(3-allyloxy-2-hydroxypropyl)-2-aminoethyl)-2-imidazolidinone, available as 41,026-8 from Aldrich Chemical Company; poly(2-ethyl-2-oxazoline) (37,284-6, 37,285-4, 37,397-4, available from Aldrich Chemical Company), and the like, as well as mixtures thereof. Examples of suitable antioxidants include didodecyl 3,3'-thiodipropionate, available as Cyanox LTDP, and as D12,840-6 from Aldrich Chemical Company; ditridecyl 3,3'-thiodipropionate, available as Cyanox 711 and as 41,311-9 from Aldrich Chemical Company; ditetradecyl 3,3'-thiodipropionate, available as Cyanox STDP and as 41,312-7 from Aldrich Chemical Company; dicetyl 3,3'-thiodipropionate, available as Evanstab 16 from Evans Chemetics Corporation; dioctadecyl 3,3'-thiodipropionate, available as Cyanox STDP and as 41,310-0 from Aldrich Chemical Company; triethyleneglycol bis(3-(3'-tert-butyl-4'-hydroxy-5'-methylphenyl) propionate), available as Irganox 245 from Ciba-Geigy Corporation; octadecyl 3-(3,5-di-tert-butyl-4-hydroxyphenyl)propionate, available as Ultranox 276 from General Electric Company; 1,6-hexamethylene bis(3,5-di-tert-butyl-4-hydroxy hydrocinnamate), available as Irganox 259 from Ciba-Geigy Corporation; tetrakis (methylene (3,5-di-tert-butyl-4-hydroxy hydrocinnamate)), available as Irganox 1010 from Ciba-Geigy Corporation; thiodiethylenebis(3,5-di-tert-butyl-4-hydroxy) hydrocinnamate, available as Irganox 1035 from Ciba-Geigy Corporation; octadecyl 3,5-di-tert-butyl-4-hydroxy hydrocinnamate, available as Irganox 1076 from Ciba-Geigy Corporation; N,N'-hexamethylenebis(3,5-di-tert-butyl-4-hydroxy hydrocinnamide), available as Irganox 1098 from Ciba-Geigy Corporation; 2,2-bis(4-(2-(3,5-di-tert-butyl-4-hydroxyhydrocinnamoyloxy))ethoxy phenyl) propane, available as Topanol 205 from ICI America Corporation; N-stearoyl-ρ-aminophenol, available as Sucnox-18 from Hexcel Corporation; 2,6-di-tert-butyl-4-methyl phenol, available as Ultranox 226 from General Electric Company; 2,6-di-tert-butyl-ρ-cresol, available as Vulkanox KB from Mobay Chemicals; 2,6-di-tert-butyl-α-dimethylamino-ρ-cresol, available as Ethanox 703 from Ethyl Corporation; 2,2'-isobutylidene-bis(4,6-dimethyl phenol), available as Vulkanox NKF from Mobay Chemicals; 2,2'-methylenebis(6-tert-butyl-4-methylphenol), available as Cyanox 2246 and as 41,315-5 from Aldrich Chemical Company; 2,2'-methylene bis(6-tert-butyl-4-ethylphenol), available as Cyanox 425 and as 41,314-3 from Aldrich Chemical Company; tris(4-tert-butyl-3-hydroxy-2,6-dimethylbenzyl) isocyanurate, available as Cyanox 1790 and as 41,322-4 LTDP and D12,840-6 from Aldrich Chemical Company; 1,3,5-trimethyl-2,4,6-tris (3,5-di-tert-butyl-4-hydroxybenzyl) benzene, available as Ethanox 300 and as 41,328-3 from Aldrich Chemical Company; triphenyl phosphite, available as Lankromark LE65 from Harcros Corporation; tris(nonyl phenyl)phosphite, available as Lankromark LE109 from Harcros Corporation; tris(2,4-di-tert-butyl-phenyl)phosphite, available as Wytox 240 from Olin Corporation; 2,2'-ethylidene bis(4,6-di-tert-butylphenyl) fluorophosphonite, available as Ethanox 398 from Ethyl Corporation; octylated diphenylamine, available as Anchor ODPA from Anchor Corporation; N,N'-β,β'-naphthalene-ρ-phenylenediamine, available as Anchor DNPD from Anchor Corporation; 4,4'-methylene-bis (dibutyldithio carbamate), available as Vaniube 7723 from Vanderbilt Corporation; antimony dialkyldithio carbamate, available as Vanlube 73 from Vanderbilt Corporation; antimony dialkylphosphorodithioate, available as Vanlube 622 from Vanderbilt Corporation; molybdenum oxysulfide dithio carbamate, available as Vanlube 622 from Vanderbilt Corporation; 2,2,4-trimethyl-1,2-hydroquinoline, available as Vulkanox HS from Mobay Corporation; and the like, as well as mixtures thereof. Examples of suitable antiozonants include N-isopropyl-N'-phenyl-phenylene diamine, available as Santoflex IP from Monsanto Chemicals; N-(1,3-dimethylbutyl)-N'-phenyl-phenylene diamine, available as Santoflex 13 from Monsanto Chemicals; N,N'-di(2-octyl)-ρ-phenylene diamine, available as Antozite-1 from Vanderbilt Corporation; N,N'-bis(1,4-dimethyl pentyl)-ρ-phenylene diamine, available as Santoflex 77 from Monsanto Chemicals; 2,4,6-tris-(N-1,4-dimethyl pentyl-ρ-phenylene diamino)-1,3,5-triazine, available as Durazone 37 from Uniroyal Corporation; 6-ethoxy-1,2-dihydro-2,2,4-trimethyl quinoline, available as Santoflex AW from Monsanto Chemicals; bis(1,2,3,6-tetrahydrobenzaldehyde) pentaerythritol acetal, available as Vulkazon AFS/LG from Mobay Corporation; paraffin wax, available as Petrolite C-700, Petrolite C-1035 from Petrolite Corporation; and the like, as well as mixtures thereof. Preferred lightfast compounds for the present application include poly(N,N-bis(2,2,6,6-tetramethyl-4-piperidinyl)- 1,6-hexanediamine-co-2,4-dichloro-6-morpholino-1,3,5-triazine) (available as Cyasorb UV-3346 and as 41,324-0 from Aldrich Chemical Company), poly(4-hydroxy-2,2,6,6-tetramethyl-1-piperidine ethanol/dimethyl succinic acid) (available as Tinuvin 622LD from Ciba-Geigy Corporation), poly(3,5-di-tert-butyl-4-hydroxy hydrocinnamic acid ester/1,3,5-tris(2-hydroxyethyl)-5-triazine-2,4,6 (1H,3H,5H)-trione (available as Good-rite 3125 from Goodrich Chemicals), N-(1,3-dimethylbutyl)-N'-phenyl-phenylene diamine (available as Santoflex 13 from Monsanto Chemicals), N,N'-di(2-octyl)-ρ-phenylene diamine (available as Antozite-1 from Vanderbilt Corporation), N,N'-bis(1,4-dimethyl pentyl)-ρ-phenylene diamine (available as Santoflex 77 from Monsanto Chemicals), L-ascorbic acid (Aldrich 25,556-4), citric acid (Aldrich 25,127-5), and the like, as well as mixtures thereof.

The second coating also includes a cationic dye mordant. The cationic dye mordant is present in the second coating in any desired or effective amount, typically at least about 1 percent by weight of the second coating, and preferably at least about 3 percent by weight of the second coating, and typically no more than about 33 percent by weight of the second coating, and preferably no more than about 30 percent by weight of the second coating, although the amount can be outside of these ranges.

Examples of suitable cationic dye mordants include pyridinium quaternary salts, such as N-(lauroyl colamino formyl methyl) pyridinium chloride (Emcol E-607L, available from Witco Chemical Ltd.), N-(stearoyl colamino formyl methyl) pyridinium chloride (Emcol E-607S, available from Witco Chemical Ltd.), and the like, other quaternary salts, such as Cordex AT-172 and other materials available from Finetex Corporation, quaternary acrylic copolymer latices, including those of the general formula

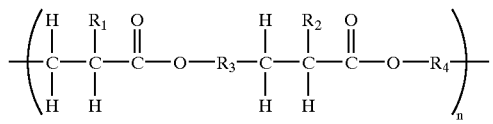

wherein n is a number representing the number of repeat monomer units, typically being from about 10 to about 100, and preferably about 50, $R_1$ and $R_2$ each, independently of the other, is a hydrogen atom or an alkyl group, such as methyl or the like, $R_3$ is a hydrogen atom, an alkyl group, typically with from 1 to about 20 carbon atoms, or an aryl group, typically with from about 6 to about 14 atoms, and $R_4$ is $—N(CH_3)_3{}^+X-$, wherein X is any desired or suitable anion, including (but not limited to) $Cl-$, $Br-$, $I-$, $HSO_3-$, $S_3{}^{2-}$, $CH_2SO_3+$, $H_2PO_4-$, $HPO_4{}^{2-}$, $PO_4{}^{3-}$, or the like, and the degree of quaternization is from about 1 to about 100 percent, such as polymethyl acrylate trimethyl ammonium chloride latex (HX42-1, obtained from Interpolymer Corporation), and the like. Also suitable are monoammonium compounds as disclosed in, for example, U.S. Pat. No. 5,320,902, the disclosure of which is totally incorporated herein by reference, formaldehyde-free GARDOL DR/NF®), available from Apollo Chemical Corporation, polyquaternary amine PERCHEM 553®, available from Chem Link Industrial, polyquaternary amine POLY PLUS 1290®, available from Betz Paper Chem Inc.; ARMOSOFT 420-90®, available from Akzo Chemie Chemicals, quaternary ammonium block copolymers, such as Mirapol A-15 and Mirapol WT available from Miranol, Incorporated, Dayton, New Jersey, prepared as disclosed/in U.S. Pat. No. 4,157,388, the disclosure of which is totally incorporated herein by reference, Mirapol AZ-1 available from Miranol, Incorporated, prepared as disclosed in U.S. Pat. No. 4,719,282, the disclosure of which is totally incorporated herein by reference, Mirapol AD-1, available from Miranol, Incorporated, prepared as disclosed in U.S. Pat. No. 4,157,388, Mirapol 9, Mirapol 95, and Mirapol 175, available from Miranol, Incorporated, Dayton, New Jersey, prepared as disclosed in U.S. Pat. No. 4,719,282, and the like, as well as mixtures thereof.

The second coating also includes a filler. The filler is present in the second coating in any desired or effective amount, typically at least about 1 percent by weight of the second coating, and preferably at least about 7 percent by weight of the second coating, and typically no more than about 25 percent by weight of the second coating, and preferably no more than about 20 percent by weight of the second coating, although the amount can be outside of these ranges.

Examples of suitable fillers include hollow microspheres, including Eccospheres MC-37 (sodium borosilicate glass), 'Eccospheres FTD 202 (high silica glass, 95 percent SiO$_2$), and Eccospheres SI (high silica glass, 98 percent SiO$_2$), all available from Emerson and Cuming Inc.; Fillite 200/7 (alumino-silicate ceramic available from Fillite U.S.A.); Q-Cel 300 (sodium borosilicate available from Philadelphia Quartz); B23/500 (soda lime glass available from 3M Company); Ucar BJO-0930 (phenolic polymers available from Union Carbide); Miralite 177 (vinylidene chloride-acrylonitrile available from Pierce & Stevens Chemical Corporation); and the like. Examples of solid microspheres include Spheriglass E250P2 and 10002A (soda-lime glass A-glass, E-glass), available from Potters Industries; Micro-P (soda-lime glass), available from D.J. Enterprises; ceramic microspheres (available from Fillite U.S.A. and Zeelan Industries); glass beads 3–10 microns (#07666 available from Polymer Sciences Inc); solid plastic microspheres available from Rohm & Haas, Dow Chemicals, Diamond Shamrock, and E. I. DuPont de Nemours & Company; hollow composite microspheres of polyvinylidene chloride/acrylonitrile copolymer shell 15 percent by weight and calcium carbonate 85 percent by weight, available as Dualite M 6001 AE, and Dualite M 6017 AE from Pierce & Stevens Corporation; and the like. Mixtures of two or more types of microspheres can also be employed. Microspheres are disclosed in, for example, *Encyclopedia of Polymer Science and Engineering*, vol. 9, pages 788 et seq., John Wiley and Sons (New York 1987), the disclosure of which is totally incorporated herein by reference, like stearate coated calcium carbonate, available as Camet-CAL, Camet-CAL ST from Genstar Stone Products Company; sodium metasilicate anhydrous available as Drymet 59 from Crossfield Chemicals, Incorporated, sodium metasilicate pentahydrate Crystamet 1020, Crystamet 2040, Crystamet 3080 from Crossfield Chemicals, Incorporated; organophilic montmorillonitrile clay available as Bentone 38C.G, and magnesium aluminum silicate chemically modified, available as Bentone 38EV from Rheox Incorporated; magnesium carbonate, available as Elastocarb Tech Light, Elastocarb Tech Heavy, Elastocarb UF from Morton International; magnesium oxide, available as Elastomag 100, Elastomag 100 R, Elastomag 170, Elastomag 170 micropellet; zirconium oxide (SF-EXTRA available from Z-Tech Corporation), colloidal silicas, such as Syloid 74 available from Grace Company, (preferably present, in one embodiment, in an amount of from about 10 to about 70 percent by weight percent), amorphous silica available as Flow-Gard CC 120, Flow-Gard CC 140, Flow-Gard CC 160 from PPG Industries, titanium dioxide (available as Rutile or Anatase from NL Chem Canada, Inc.), hydrated alumina (Hydrad TMC-HBF, Hydrad TM-HBC, available from J. M. Huber Corporation), barium sulfate (K. C. Blanc Fix HD80 available from Kali Chemie Corporation), calcium carbonate (Microwhite Sylacauga Calcium Products), high brightness clays (such as Engelhard Paper Clays), calcium silicate (available from J. M. Huber Corporation), cellulosic materials insoluble in water or any organic solvents (such as those available from Scientific Polymer Products), blends of calcium fluoride and silica, such as Opalex-C available from Kemira.O.Y, zinc oxide, such as Zoco Fax 183 available from Zo Chem, blends of zinc sulfide with barium sulfate, such as Lithopane available from Schteben Company, barium titanate, 20,810-8 available from Aldrich Chemicals, antimony oxide 23,089-8 available from Aldrich Chemicals, and the like, as well as mixtures thereof. Brightener fluorescent pigments of coumarin derivatives, such as Formula #633 available from Polymer Research Corporation of America and fluorescent pigments of oxazole derivatives, such as Formula #733 available from Polymer Research Corporation of America, can enhance color mixing and assist in improving print-through in recording sheets of the present invention. Preferred fillers for the present invention include hollow microspheres, such as Eccospheres MC-37 (sodium borosilicate glass), Eccospheres FTD 202 (high silica glass, 95 percent S102), and Eccospheres SI (high silica glass, 98 percent S102), all available from Emerson and Cuming Inc., zirconium oxide (SF-EXTRA available from Z-Tech Corporation), colloidal silicas, such as Syloid 74 available from Grace Company (preferably present, inone embodiment, in an amount of from about 10 to about 70 percent by weight amorphous silica available as Flow-Gard CC 120, Flow-Gard CC 140, Flow-Gard CC 160, from PPG Industries), titanium dioxide (available as Rutile or Anatase from NL Chem Canada, Inc.), hydrated alumina (Hydrad TMC-HBF, Hydrad TM-HBC, available from J. M. Huber Corporation), barium sulfate (K.C. Blanc Fix HD80, available from Kali Chemie Corporation), calcium carbonate (Microwhite Sylacauga Calcium Products), high brightness clays (such as Engelhard Paper Clays), calcium silicate (available from J. M. Huber Corporation), cellulosic materials insoluble in water or any organic solvents (such as those available from Scientific Polymer Products), blends of calcium fluoride and silica, such as Opalex-C available from Kemira.O.Y, zinc oxide, such as Zoco Fax 183, available from Zo Chem, blends of zinc sulfide with barium sulfate, such as Lithopane, available from Schteben Company, barium titanate (Aldrich 20,810-8), antimony oxide (Aldrich 23,089-8), and the like, as well as mixtures thereof. Brightener fluorescent pigments of coumarin derivatives, such as formula #633 available from Polymer Research Corporation of America, fluorescent pigments of oxazole derivatives, such as formula #733 available from Polymer Research Corporation of America, and the like can enhance color mixing and assist in improving print-through in papers of the present invention.

Optionally, the second coating can also contain a biocide. When present, the biocide is present in the second coating in any desired or effective amount, typically at least about 1 percent by weight of the second coating, and typically no more than about 4 percent by weight of the second coating, and preferably no more 'than about 3 percent by weight of the second coating, although the amount can be outside of these ranges.

Examples of suitable biocides include (A) non-ionic biocides, such as (1) 2-hydroxypropylmethane thiosulfonate (Busan 1005, available from Buckman Laboratories Inc.); (2) 2-(thio cyanomethyl thio) benzothiazole (Busan 30WB, 72WB, available from Buckman Laboratories Inc.); (3) methylene bis (thiocyanate) (Metasol T-10, available from Calgon Corporation; AMA-110, available from Vinings Chemical Company; Vichem MBT, available from Vineland Chemical Company; Aldrich 10,509-0); (4) 2-bromo-4'-hydroxyacetophenone (Busan 90, available from Buckman Laboratories); (5) 1,2-dibromo-2,4-dicyano-butane (Metasol CB-210, CB-235, available from Calgon Corporation); (6) 2,2-dibromo-3-nitropropionamide (Metasol RB-20, available from Calgon Corporation; Amerstat 300, available from Drew Industrial Div.); (7) N-α-(1- nitroethyl benzylethylene diamine) (Metasol J-26, available from Calgon Corporation); (8) dichlorophene (G-4, available from Givaudan Corporation); (9) '3,5-dimethyl tetrahydro-2H-1,3,5-thiadiazine-2-thione (SLIME-TROL RX-28, available from Betz Paper Chem Inc.; Metasol D3T-A, available from Calgon Corporation; SLIME ARREST, available from Western Chemical Company); (10) a non-ionic blend of a sulfone, such as bis (trichloromethyl) sulfone and methylene bisthiocyanate (available as SLIME-TROL RX-38A from Betz Paper Chem Inc.); (11) a non-ionic blend of methylene bisthiocyanate and bromonitrostyrene (available as SLIME-TROL RX-41 from Betz Paper Chem Inc.); (12) a non-ionic blend of 2-(thiocyanomethylthio) benzothiazole (53.2 percent by weight) and 2-hydroxypropyl methanethiosulfonate (46.8 percent by weight) (available as BUSAN 25 from Buckman Laboratories Inc.); (13) a non-ionic blend of methylene bis(thiocyanate) 50 percent by weight and 2-(thiocyanomethylthio) benzothiazole 50 percent by weight (available as BUSAN 1009, 1009WB from Buckman Laboratories Inc.); (14) a non-ionic blend of 2-bromo-4'-hydroxyacetophenone (70 percent by weight) and 2-(thiocyanomethylthio) benzothiazole (30 percent by weight) (BUSAN 93, available from Buckman Laboratories Inc.); (15) a non-ionic blend of 5-chloro-2-methyl-4-isothiazoline-3-one (75 percent by weight) and 2-methyl-4-isothiazolin-3-one (25 percent by weight), (available as AMERSTAT 250 from Drew Industrial Division; NALCON 7647, from NALCO Chemical Company; Kathon LY, from Rohm and Haas Co.); and the like, as well as mixtures thereof. Also suitable are (B) anionic biocides, such as (1) anionic potassium N-hydroxymethyl-N-methyl-dithiocarbamate (available as BUSAN 40 from Buckman Laboratories Inc.); (2) an anionic blend of N-hydroxymethyl-N-methyl dithiocarbamate (80 percent by weight) and sodium 2-mercapto benzothiazole (20 percent by weight) (available as BUSAN 52 from Buckman Laboratories Inc.); (3) an anionic blend of sodium dimethyl dithiocarbamate 50 percent by weight and (disodium ethylenebis-dithiocarbamate) 50 percent by weight (available as METASOL 300 from Calgon Corporation; AMERSTAT 272 from Drew Industrial Division; SLIME CONTROL F from Western Chemical Company); (4) an anionic blend of N-methyldithiocarbamate 60 percent by weight and disodium cyanodithioimidocarbonate 40 percent by weight (available as BUSAN 881 from Buckman Laboratories Inc); (5) An anionic blend of methylene bis-thiocyanate (33 percent by weight), sodium dimethyl-dithiocarbamate (33 percent by weight), and sodium ethylene bisdithiocarbamate (33 percent by weight) (available as AMERSTAT 282 from Drew Industrial Division; AMA-131 from Vinings Chemical Company); (6) sodium dichlorophene (G-4-40, available from Givaudan Corp.); and the like, as well as mixtures thereof. Also suitable are (C) cationic biocides, such as (1) cationic poly (oxyethylene (dimethylamino)-ethylene (dimethylamino) ethylene dichloride) (Busan 77, available from Buckman Laboratories Inc.); (2) a cationic blend of methylene bisthiocyanate and dodecyl guanidine hydrochloride (available as SLIME TROL RX-31, RX-32, RX-32P, RX-33, from Betz Paper Chem Inc.); (3) a cationic blend of a sulfone, such as bis(trichloromethyl) sulfone and a quaternary ammonium chloride (available as SLIME TROL RX-36 DPB-865 from Betz Paper Chem. Inc.); (4) a cationic blend of methylene bis thiocyanate and chlorinated phenols (available as SLIME-TROL RX-40 from Betz Paper Chem Inc.); and the like, as well as mixtures thereof. Preferred biocides for the present application include (A) nonionic biocides, such as (1) 2-hydroxypropylmethane thiosulfonate (Busan 1005, available from Buckman Laboratories Inc.), (2) 2-(thio cyanomethyl thio) benzothiazole (Busan 30WB, 72WB, available from Buckman Laboratories Inc.), (3) methylene bis(thiocyanate) (Metasol T-10, available from Calgon Corporation, AMA,-110 available from Vinings Chemical Company, Vichem MBT, available from Vineland Chemical Company, Aldrich 10,509-0), (B) anionic biocides, such as (1) anionic potassium N-hydroxymethyl-N-methyl-dithiocarbamate (available as BUSAN 40 from Buckman Laboratories Inc.), (2) an anionic blend of N-hydroxymethyl-N-methyl dithiocarbamate (80 percent by weight) and sodium 2-mercapto benzothiazole (20 percent by weight) (available as BUSAN 52 from Buckman Laboratories Inc.), (C) cationic biocides, such as (1) cationic poly(oxyethylene(dimethylamino)-ethylene (dimethylamino)ethylene dichloride) (Busan 77, available from Buckman Laboratories Inc.), (2) a cationic blend of methylene bisthiocyanate and dodecyl guanidine hydrochloride (available as SLIME TROL RX-31, RX-32, RX-32P, RX-33 from Betz Paper Chem Inc.), and the like, as well as mixtures thereof.

Preferred relative amounts of the components in the second coating of the present invention for various applications can be determined by preparing blends in water of the binder, ink wetting agent, lightfastness-imparting agent, cationic dye mordant, filler, and optional biocide and coating them onto various base sheets to yield coated papers with a single layer thereover. After drying at 100° C., the test papers can be tested for desired characteristics, such as coating adhesion to the base sheet, print quality, drying times of the images, lightfastness, intercolor bleed, and the like. The data can then be analyzed statistically for an optimum range of components.

Situated on the second surface of the cellulosic substrate, and in contact with the cellulosic substrate, is a third coating. The third coating is generally matte (whereas the second coating is generally glossy), and also improves traction between the coated paper of the present invention and the paper handling parts in printing apparatus that move the paper along the paper path. It, like the first and second coatings, is also capable of receiving an image from an acoustic ink jet printing process. The third coating is of any desired or effective thickness. Typically, the total thickness of the third coating layer is at least about 0.1 micron, and preferably at least about 0.5 micron, and typically is no more than about 25 microns and preferably no more than about 10 microns, although the thickness can be outside of these ranges.

The third coating includes an extrudable alkylene polymer as a binder. The binder polymer is present in the third coating in any desired or effective amount, typically at least about 5 percent by weight of the third coating, and preferably at least about 24 percent by weight of the third coating, and typically no more than about 95 percent by weight of the third coating, and preferably no more than about 80 percent by weight of the third coating, although the amount can be outside of these ranges.

Examples of suitable extrudable alkylene binder polymers include polyalkylene homopolymers and copolymers, wherein alkyl typically has from 2 to about 6 carbon atoms, including ethyl, propyl, and butyl, such as polyethylene (such as #041, #042, #535, #536, #558, and #560, available from Scientific Polymer Products, and 26,935-2, 42,803-5, 42,807-8, 42,808-6, 42,809-4, 42,810-8, 42,796-9, 42,798-5, 42,799-3, 42,901-5, 42,777-2, 42,778-0, and 42,779-9, available from Aldrich Chemical Company), polypropylene (such as #130, #780, #781, #782, and #783, available from Scientific Polymer Products, and 42,811-6 and 42,902-3, available from Aldrich Chemical Company), poly(1-butene) (such as #128, #337, and #338, available from Scientific Polymer Products), poly(isobutylene) (such as #040A, #040B, #040E, #668, #681, #683, and #684, available from Scientific Polymer Products), poly (propylene-co-ethylene) copolymers (such as #454 and #455, available from Scientific Polymer Products, and 42,792-6, 42,795-0, 42,794-2, 42,913-9, 42,819-1, and 42,820-5, available from Aldrich Chemical Company), poly(ethylene-co-1-butene) copolymers (such as 43,469-8 and 43,472-8, available from Aldrich Chemical Company), poly (ethylene-co-1-butene-co-1-hexene) copolymers such as 43,474-4 and 43,475-2, available from Aldrich Chemical Company), poly(ethylene-co-methylacrylate) copolymers (such as 43,263-6, 43,264-4, and 43,265-2, available from Aldrich Chemical Company), poly(ethylene-co-methylacrylate-co-glycidyl methacrylate) copolymers (such as 43,364-0, available from Aldrich Chemical Company), poly(ethylene-co-ethylacrylate) copolymers (such as #358, available from Scientific Polymer Products), poly(ethylene-co-ethylacrylate-co-maleic anhydride) copolymers (such as 43,083-8 and 43,084-6, available from Aldrich Chemical Company), poly(ethylene-co-butylacrylate) copolymers (such as 43,077-3 and 43,078-1, available from Aldrich Chemical Company), poly (ethylene-co-butylacrylate-co-carbon monoxide) copolymers (such as 43,064-1 and 43,066-8, available from Aldrich Chemical Company, poly(ethylene-co-glycidylyl methacrylate) copolymers (such as 43,086-2, available from Aldrich Chemical Company), poly(ethylene-co-carbon monoxide) copolymers (such as 42,835-3, available from Aldrich Chemical Company), poly(ethylene-co-acrylic acid) copolymers (such as 18,104-8, 42,671-7, and 42,672-5, available from Aldrich Chemical Company), poly(ethylene-co-acrylic acid) copolymer sodium salts (such as 42,674-1 and 42,673-3, available from Aldrich Chemical Company), poly(ethylene-co-acrylic acid) copolymer zinc salts (such as 42,676-6 and 42,676-8, available from Aldrich Chemical Company), poly(ethylene-co-methacrylic acid) copolymers (such as 42,662-8, 42,663-6, and 42,664-4, available from Aldrich Chemical Company), poly(ethylene-co-methacrylic acid) copolymer lithium salts (such as 42,670-9, available from Aldrich Chemical Company), poly(ethylene-co-methacrylic acid) copolymer sodium salts (such as 42,669-5, available from Aldrich Chemical Company), poly(ethylene-co-methacrylic acid) copolymer zinc salts (such as 42,668-7 and 42,666-0, available from Aldrich Chemical Company), poly(ethylene-co-vinylacetate-co-methacrylic acid) copolymers (such as 42,654-7 and 42,655-5, available from Aldrich Chemical Company), poly(ethylene-co-vinyl acetate-co-carbon monoxide) copolymers (such as 43,062-5, available from Aldrich Chemical Company), poly(ethylene-co-vinyl acetate)-graft-poly(maleic anhydride) copolymers (such as 42,652-0 and 42,653-9, available from Aldrich Chemical Company), poly(ethylene)-graft-poly(maleic anhydride) copolymers (such as 42,650-4 and 42,781-0, available from Aldrich Chemical Company), poly(propylene-co-1-butene) copolymers (such as 42,822-1, available from Aldrich Chemical Company), poly(propylene7co-1-hexene) copolymers (such as 42,824-8, available from Aldrich Chemical Company), poly(propylene-co-1-butene-co-ethylene) copolymers (such as 42,825-6, available from Aldrich Chemical Company), poly(propylene)-graft-poly(maleic anhydride) copolymers (such as 42,651-2 and 42,784-5, available from Aldrich Chemical Company), poly (isobutylene-co-isoprene) copolymers (such as #874, available from Scientific Polymer Products), poly(ethylene-co-propylene-co-diene) terpolymers (such as #350, #360, #448, and #449, available from Scientific Polymer Products), polystyrene-block-polyisoprene copolymers (such as 43,246-6, available from Aldrich Chemical Company), polystyrene-block-polybutadiene copolymers (such as 43,248-2 and 43,249-0, available from Aldrich Chemical Company), polystyrene-block-polyisoprene-block-polystyrene copolymers (such as 43,239-3, 43,240-7, and 43,241-5, available from Aldrich Chemical Company), polystyrene-block-poly(ethylene-random-butylene)-block-polystyrene copolymers (such as 43,245-8, available from Aldrich Chemical Company), and the like, as well as mixtures thereof.

The third coating also includes an antistatic agent. The antistatic agent is present in the third coating in any desired or effective amount, typically at least about 1 percent by weight of the third coating, and typically no more than about 5 percent by weight of the third coating, and preferably no more than about 3 percent by weight of the third coating, although the amount can be outside of these ranges.

Examples of suitable antistatic agents include the cationic and anionic antistatic agents set forth hereinabove as being suitable for the first coating, including (but not limited to) anionic antistatic components derived from monoester sulfosuccinafes, diester sulfosuccinates, and sulfosuccinamates, cationic antistatic components derived from quaternary salts, quaternary acrylic copolymer latices, ammonium quaternary salts such as those disclosed in U.S. Pat. No. 5,320,902 (Malhotra et al), the disclosure of which is totally incorporated herein by reference, quaternary phosphonium salts, such as hexadecyl tributyl phosphonium bromide (Aldrich 27,620-0), and the like, as well as mixtures thereof.

The third coating also includes a lightfastness-imparting agent. The lightfastness-imparting agent is present in the third coating in any desired or effective amount, typically at least about 1 percent by weight of the third coating, and typically no more than about 5 percent by weight of the third coating, and preferably no more than about 3 percent by weight of the third coating, although the amount can be outside of these ranges.

Examples of suitable lightfastness-imparting agents include those set forth hereinabove as being suitable for the second coating, including (but not limited to) antioxidants, such as 2,2'-methylenebis (6-tert-butyl-4-methylphenol) (Cyanox 2246, 41,315-5 available from Aldrich Chemical Company), 2,2'-methylenebis(6-tert-butyl-4-ethyl phenol) (Cyanox 425, 41,314-3 available from Aldrich Chemical Company), and the like, UV absorber compounds, such as 2-(4-benzoyl-3-hydroxyphenoxy) ethylacrylate (Cyasorb UV-416, 41,321-6, available from Aldrich Chemical Company), 1,2-hydroxy-4-(octyloxy) benzophenone (Cyasorb UV-531, 41,315-1 available from Aldrich Chemical Company), and the like, antiozonants, such as N-isopropyl-N'-phenyl-phenylenediamine, available as Santoflex IP from Monsanto Chemicals, N-(1,3-dimethylbutyl)-N'-phenyl-phenylene diamine, available as Santoflex 13 from Monsanto Chemicals, N,N'-di(2-octyl)-4-phenylene diamine, available as Antozite-1 from Vanderbilt Corporation, N,N'-bis (1,4-dimethyl pentyl)-4-phenylene diamine, available as Santoflex 77 from Monsanto Chemicals, 2,4,6-tris-(N-1,4-dimethyl pentyl-4-phenylene diamino)-1,3,5-triazine, available as Durazone 37 from Uniroyal Corporation, 6-ethoxy-1,2-dihydro-2,2,4-trimethylquinoline, available as Santoflex AW from Monsanto Chemicals, bis-(1,2,3,6-tetrahydrobenzaldehyde) pentaerythritol acetal, available as Vulkazon AFS/LG from Mobay Corporation, Paraffin Wax, available as Petrolite C-700 and Petrolite C-1035 from Petrolite Corporation, and the like, as well as mixtures thereof.

The third coating also includes a plasticizer. The plasticizer is present in the third coating in any desired or effective amount, typically at least about 1 percent by weight of the third coating, and typically no more than about 25 percent by weight of the third coating, and preferably no more than about 20 percent by weight of the third coating, although the amount can be outside of these ranges.

Examples of suitable plasticizers include those set forth hereinabove as being suitable for the first coating. Also suitable are (1) octadecane (Aldrich O-65-2), (2) 1-octadecanol (Aldrich 25,876-8), (3) tricosane (Aldrich 26,385-0), (4) tetracosane (Aldrich T,875-2), (5) pentacosane (Aldrich 28,693-1), (6) heptacosane (Aldrich 28,606-0), (7) octacosane (Aldrich O-50-4), (8) triacontane (Aldrich 26,384-2), (9) 1-bromodecane (Aldrich 14,578-5), (10) 10-bromo-1-decanol (Aldrich 31,089-1), (11) 11-bromo-1-undecanol (Aldrich 18,417-6), (12) 1 1-bromo-undecanoic acid (Aldrich B8,280-4), (13) 12-bromo- 1-dodecanol (Aldrich 22,467-7), (14) 12-bromo-dodecanoic acid (Aldrich 20,099-9), (15) 2-bromo hexadecanoic acid (Aldrich 23,842-2), and the like, as well as mixtures thereof. Preferred plasticizers have a melting point of less than about 75° C., and include those having allyl functionality and bromo functionality, such as allyl diethyl phosphonoacetate (Aldrich 40,570-1), 11-bromo-undecanoic acid (Aldrich B8,280-4), and the like.

The third coating also contains a filler. The filler is present in the third coating in any desired or effective amount, typically at least about 2 percent by weight of the third coating, and preferably at least about 17 percent by weight of the third coating, and typically no more than about 60 percent by weight of the third coating, and preferably no more than about 50 percent by weight of the third coating, although the amount can be outside of these ranges.

Examples of suitable fillers include those set forth hereinabove as being suitable for the second coating, including (but not limited to) zirconium oxide (SF-EXTRA available from Z-Tech Corporation), colloidal silicas (such as Syloid 74 available from W.R. Grace & Company), titanium dioxide (available as Rutile or Anatase from NL Chem Canada, Inc.), hydrated alumina (Hydrad TMC-HBF, Hydrad TM-HBC, available from J. M. Huber Corporation), barium sulfate (K. C. Blanc Fix HD80, available from Kali Chemie Corporation), calcium carbonate (Microwhite Sylacauga Calcium Products), high brightness clays (such as Engelhard Paper Clays), calcium silicate (available from J. M. Huber Corporation), cellulosic materials insoluble in water or any organic solvents (such as those available from Scientific Polymer Products), blends of calcium fluoride and silica, such as Opalex-C available from Kemira.O.Y, zinc oxide, such as Zoco Fax 183, available from Zo Chem, blends of zinc sulfide with barium sulfate, such as Lithopane, available from Schteben Company, and the like, as well as mixtures thereof. Brightener pigments can enhance color mixing and assist in improving print-through in recording sheets of the present invention.

The first, second, and third coatings can be applied to the cellulosic substrate by any suitable technique. For example, the layer coatings can be applied by techniques such as melt extrusion, reverse roll coating, solvent extrusion, and dip coating processes. In dip coating, a web of material to be coated is transported below the surface of the coating material (which generally is dissolved in a solvent) by a single roll in such a manner that the exposed site is saturated, followed by the removal of any excess coating by a blade, bar, or squeeze roll; the process is then repeated with the appropriate coating materials for application of the other layered coatings. With reverse roll coating, the premetered coating material (which generally is dissolved in a solvent) is transferred from a steel applicator roll onto the web material to be coated. The metering roll is stationary or is rotating slowly in the direction opposite to that of the applicator roll. In slot extrusion coating, a flat die is used to apply coating material (which generally is dissolved in a solvent) with the die lips in close proximity to the web of material to be coated. The die can have one or more slots if multilayers are to be applied simultaneously. In multilayer slot coating, the coating solutions form a liquid stack in the gap where the liquids come in the contact with the moving web to form a coating. The stability of the interface between the two layers depends on wet thickness, density, and viscosity ratios of both layers which need to be kept as close to one as possible. Once the desired amount of coating has been applied to the web, the coating is dried, typically at from about 25 to about 100° C. in an air dryer.

The extrudable coatings for the present invention can be prepared by melt-forming processes encompassing calendering and various methods of extrusion, such as blown bubble, slot-die casting, and coating on a substrate, as disclosed in the *Encyclopedia of Chemical Technology*, Vol. 10, p. 234–245, Wiley-Interscience (1978),,the disclosure of which is totally incorporated herein by reference. In calendering, a continuous film is formed by squeezing a thermoplastic material between two or more horizontal metal rolls.

The coated papers of the present invention, when used in ink jet printing processes (including both those using aqueous inks liquid at room temperature and those using hot melt inks, and including acoustic ink jet printing processes), enable the generation of images that simulate in look and feel those obtained with, for example, silver halide technology.

The Hercules size values recited herein were measured on a Hercules sizing tester (available from Hercules Incorporated) as described in TAPPI STANDARD T-530 pm-83, issued by the Technical Association of the Pulp and Paper Industry. This method is closely related to the widely used ink flotation test. The TAPPI method has the advantage over the ink flotation test of detecting the end point photometrically. The TAPPI method employs a mildly acidic aqueous dye solution as the penetrating component to permit optical detection of the liquid front as it moves through the paper. The apparatus determines the time required for the reflectance of the sheet surface not in contact with the penetrant to drop to a predetermined (80 percent) percentage of its original reflectance.

The porosity values recited herein were measured with a Parker Print-Surf porosity meter, which records the volume of air per minute flowing through a sheet of paper.

The edge raggedness values recited herein were measured using an Olympus microscope equipped with a camera capable of enlarging the recorded ink jet images. The edge raggedness value is the distance in millimeters for the intercolor bleed on a checkerboard pattern.

The coated papers of the present invention exhibit reduced curl upon being printed with aqueous inks. Generally, "curl" refers to the distance between the base line of the arc formed by recording sheet when viewed in cross-section across its width (or shorter dimension, for example, 8.5 inches in an 8.5 by 11 inch sheet, as opposed to length, or longer dimension, for example, 11 inches in an 8.5 by 11 inch sheet) and the midpoint of the arc. To measure curl, a sheet was held with the thumb and forefinger in the middle of one of the long edges of the sheet (for example, in the middle of one of the 11 inch edges in an 8.5 by 11 inch sheet) and the arc formed by the sheet was matched against a pre-drawn standard template curve.

The lightfast values of the ink jet images recited herein were measured in a Mark V Lightfast Tester obtained from Microscal Company, London, England.

The gloss values recited herein were obtained on a 750 Gloss meter Glossgard from Pacific Scientific (Gardner/Neotec Instrument Division).

The optical density measurements recited herein were obtained on a Pacific Spectrograph Color System, which consists of two major components, an optical sensor and a data terminal. The optical sensor employs a 6 inch integrating sphere to provide diffuse illumination and 2 degrees viewing. This sensor can be used to measure both transmission and reflectance samples. When reflectance samples are measured, a specular component may be included. A high resolution, full dispersion, grating monochromator was used to scan the spectrum from 380 to 720 nanometers. The data terminal featured a 12 inch CRT display, numerical keyboard for selection of operating parameters and the entry of tristimulus values, and an alphanumeric keyboard for entry of product standard information. The print through value as characterized by the printing industry is Log base 10 (reflectance of a single sheet of unprinted paper against a black background/reflectance, of the back side of a black printed area against a black background) measured at a wavelength of 560 nanometers.

The waterfastness values measured herein were determined by soaking the images in tap water. The optical densities of the images were measured prior to soaking and subsequent to soaking, and the value prior to soaking divided by the value subsequent to soaking provided the percentage waterfastness value.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I

Paper Preparation

Coated papers were prepared by a solvent extrusion process (single side each time initially) on a Faustel Coater using a one slot die by providing paper base sheets (roll form) with a thickness of 150 microns, a Hercules size value of 1,000 seconds, and a porosity of 100 milliliters per minute, and coating the base sheets at 100° C. with a melt blend comprising 60.0 parts by weight of the extrudable binder polyethylene terephthalate (Vitel 5833), 30.0 parts by weight of the plasticizer 4-allyl anisole (Aldrich A2,920-8), and 10.0 parts, by weight of the anionic antistatic compound disodium N-alkyl-sulfosuccinamate (Geropon FA-82, Rhone Poulenc) in a thickness of 5 microns. This coating layer exhibited a porosity of 10 milliliters per minute.

The first layers thus formed were then overcoated with an ink receiving layer comprising 40.0 parts by weight of the hydrophilic binder methylcellulose (Methocel A, obtained from Dow Chemical Company), 20.0 parts by weight of the ink wetting agent poly(ethylene, oxide) (POLY OX WSRN-3000, obtained from Union Carbide Corporation), 25.0 parts by weight of the dye mordant quaternary acrylic copolymer latex polymethyl acrylate trimethyl ammonium chloride latex (HX42-1, obtained from Interpolymer Corporation), 2.0 parts by weight of the UV absorber poly(N,N-bis(2,2,6,6-tetramethyl-4-piperidinyl)-1,6-hexanediamine-co-2,4-dichloro-6-morpholino- 1,3,5-triazine) (Cyasorb UV-3346, 41,324-0, obtained from Aldrich Chemical Company), 2.0 parts by weight of the antioxidant L-ascorbic acid (Aldrich 25,556-4) 1.0 part by weight of the biocide 2-hydroxypropylmethane thiosulfonate (Busan 1005, obtained from Buckman Laboratories Inc.), 10.0 parts by weight of the filler colloidal silica (Syloid 74, obtained from W. R. Grace and Company), said coating composition being present in a concentration of 10 percent by weight in water. Subsequent to air drying at 100° C. and monitoring the difference in weight prior to and subsequent to coating, the'dried paper base sheet rolls contained 1.0 gram, 11 microns in thickness, of the second, ink receiving layer.

Rewinding the coated side of the paper base sheets (roll form) onto empty cores and using these rolls, the uncoated sides of the paper base sheets were coated with a mixture prepared by melt-forming at 150° C. with processes encompassing slot-die casting using a coating, composition comprising 45 parts by weight thermoplastic polymer polyethylene (#560, obtained from Scientific Polymer Products), 25 parts by weight plasticizer 10-bromo-1-decanol (Aldrich 31,089-1), 2 parts by weight UV absorbing compound 2-(4-benzoyl-3-hydroxyphenoxy) ethylacrylate (Cyasorb UV-416, 41,321-6, Aldrich Chemical Company), 2 parts by weight antioxidant compound 2,2'-methylenebis(6-tert-butyl-4-methylphenol) (Cyanox 2246, 41,315-5, Aldrich Chemical Company), 1 part by weight antiozonant compound bis-(1,2,3,6-tetrahydrobenzaldehyde) pentaerythritol acetal (Vulkazon AFS/LG, obtained from Mobay Corporation), 5 parts by weight antistatic agent hexadecyl tributyl phosphonium bromide (Aldrich 27,620-0), and 20 parts by weight filler Opalex-C (blend of calcium fluoride and silica, obtained from Kemira. O.Y.) The thermoplastic coating composition was coated on the back side of the papers in a thickness of 5 microns. The coated papers thus formed were cut from this roll in 8.5 by 11.0 inch cut sheets.

Printing With Aqueous Inks

The coated papers thus prepared were then incorporated into a Hewlett-Packard® 500-C color ink jet printer containing inks of the following compositions Cyan 15.785 parts by weight sulfolane, 10.0 parts by weight butyl carbitol, 2.0 parts by weight ammonium bromide, 2.0 parts by weight N-cyclohexylpyrrolidinone (obtained from Aldrich Chemical Company), 0.5 part by weight tris(hydroxymethyl)aminomethane (obtained from Aldrich Chemical Company), 0.35 part by weight EDTA (ethylenediamine tetra acetic acid) (obtained from Aldrich Chemical Company), 0.05 part by weight DOWICIL 150 biocide (obtained from Dow Chemical Company), 0.03 part by weight polyethylene oxide (molecular weight 18,500, obtained from Union Carbide Company), 35 parts by weight Projet Cyan 1 dye (obtained from ICI), and 34.285 parts by weight deionized water.

Magenta 15.785 parts by weight sulfolane, 10.0 parts by weight butyl carbitol, 2.0 parts by weight ammonium bromide, 2.0 parts by weight N-cyclohexylpyrrolidinone, 0.5 part by weight tris(hydroxymethyl)aminomethane, 0.35 part by weight EDTA, 0.05 part by weight DOWICIL 150 biocide, 0.03 part by weight polyethylene oxide (molecular weight 18,500), 25 parts by weight Projet magenta 1T dye (obtained from ICI), 4.3 parts by weight Acid Red 52 dye (obtained from Tricon Colors), and 41.985 parts by weight deionized water.

Yellow 15.785 parts by weight sulfolane, 10.0 parts by weight butyl carbitol, 2.0 parts by weight ammonium bromide,. 2.0 parts by weight N-cyclohexylpyrrolidinone, 0.5 part by weight tris(hydroxymethyl)aminomethane, 0.35 part by weight EDTA, 0.05 part by weight DOWICIL 150 biocide, 0.03 part by weight polyethylene oxide (molecular weight 18,500), 27.0 parts by weight Projet yellow 1G dye (obtained from ICI), 20.0 parts by weight Acid Yellow 17 dye (obtained from Tricon Colors), and 22.285 parts by weight of deionized water.

Black 20 parts by weight sulfolane, 5 parts by weight pantothenol (Aldrich 29,578-7), 5 parts by weight 1,4-bis (2-hydroxyethyl)-2-butyne (Aldrich B4,470-8), 5 parts by weight 2,2'-sulfonyldiethanol (Aldrich 18,008-4), 0.05 part by weight DOWICIL® 150 biocide, 0.05 part by weight polyethylene oxide (molecular weight 18,500), 7 parts by weight carbon black dispersion (LEVANYL® A-SF, obtained from Bayer A. G., Germany; 25 milliliters of predispersed carbon black solution containing 28 percent by weight carbon black and 6 percent by weight dispersing agent in water), and 39.9 parts by weight deionized water.

(These inks are particularly suitable for use in acoustic ink jet printing apparatus, although they can also be used in other ink jet printers, as was done for purposes of illustrating the present invention.) Images were generated on the coating containing methylcellulose, polyethylene oxide, trimethyl ammonium chloride latex, UV absorber, antioxidant, biocide, and filler on the paper thus prepared. The resulting images had a gloss value of 90, optical density values before washing of 2.55 (black), 1.80 (cyan), 1.57 (magenta), and 1.10 (yellow) and optical density values after washing at 25° C. for two minutes of 2.50 (black), 1.75 (cyan), 1.50 (magenta), and 1.10 (yellow), which reflect waterfast values of 98 percent black, 97 percent cyan, 95.5 percent magenta, and 100 percent yellow. The optical densities of unwashed images after 72 hours in a Mark V Lightfast Tester (equivalent to three months of Sunshine) were measured at 2.40 (black), 1.65 (cyan), 1.35 (magenta), and 1.10 (yellow), which reflect lightfastness values of 96 percent black, 91.5 percent cyan, 90 percent magenta, and 100 percent yellow. The high image quality obtained on these coated papers was evidenced by their low edge raggedness values of 0.12 millimeter (between black and yellow), 0.20 millimeter (between cyan and yellow), 0.15 millimeter (between magenta and yellow), and 0.20 millimeter (between magenta and cyan).

For comparison purposes, an uncoated Xerox® 4024 paper was printed with the same inks, yielding images with optical density values before washing of 1.30 (black), 1.1 (magenta), 1.15 (cyan), and 0.75 (yellow), and optical density values after washing at 25° C. for two minutes of 0.91 (black), 0.75 (magenta), 0.75 (cyan), and 0.67 (yellow), which reflect waterfastness values of 70 percent black, 68.2 percent magenta, 65.2 percent cyan, and 90 percent yellow. The optical density values of the unwashed images after 72 hours in a Mark V Lightfast Tester were measured at 1.00 (black), 0.85 (magenta), 0.80 (cyan), and 0.70 (yellow), which reflect lightfastness values of 76.9 percent black, 77.2 percent magenta, 69.6 percent cyan, and 93.3 percent yellow. The edge raggedness values were 2.0 millimeters (between black and yellow), 0.95 millimeter (between cyan and yellow), 0.40 millimeter (between magenta and yellow), and 0.85 millimeter (between magenta and cyan).

Printing With Hot Melt Inks

The coated papers thus prepared were then incorporated into an acoustic ink jet printing test fixture using the ejection mechanism disclosed in *J. Appl. Phys.*, 65(9), May 1, 1989 and references cited therein, and in U.S. Pat. No. 4,745,419, the disclosures of each of which are totally incorporated herein by reference. The test fixture used a jetting frequency of 160 MHz to generate drops of about 2 picoliters, up to 12 drops per pixel at 600 spi. The ink compositions were as follows Black A black phase change ink was prepared by mixing 15 percent by weight polyethylene monoalcohol (polymeric binder; number average molecular weight 700; viscosity at 150° C. 7.9 centipoise; melting point 110° C.; hardness value 78.5; Aldrich 44,448-0), 45 percent by weight 4-hydroxy-3-methoxy benzyl alcohol (viscosity modifier; hardness value 83.4; acoustic loss value 27 decibels per millimeter; melting point 115° C.; Aldrich 17,553-6), 30 percent by weight of a conductive complex comprising a 50/50 blend by weight of 4,4'-methylene bis (2,6-dimethylaniline) (melting point 122° C.; Aldrich 36,079-1) and toluenesulfonic acid monohydrate (melting point 105° C.; conductivity 7.5 log (picomho/cm); Aldrich 40,288-5), 5 percent by weight tetrakis (2,4-ditertbutyl phenyl)-4,4'-biphenyl diphosphonite (antioxidant; hardness value 90; Aldrich 46,852-5), and 5 percent by weight Neozapon Black X51 dye (C.I. Solvent Black C.I. 12195, obtained from BASF). The mixture was heated to a temperature of about 140° C. and stirred for a period of about 60 minutes until it formed a homogeneous solution, followed by cooling the solution to 25° C. The black ink had a hardness value of 78.5 at 23° C., an acoustic loss value of 58 decibels per millimeter, a viscosity of 8.5 centipoise at 150° C., and a conductivity of 6.9 log (picomho/cm) at 150° C.

Blue A blue phase change ink was prepared by mixing 15 percent by weight polyethylene-block-poly(ethylene glycol) (polymeric binder; number average molecular weight 1,400; 50 mole percent ethylene oxide; melting point 115° C.; Aldrich 45,896-1), 45, percent by weight xylitol (acoustic loss value 32 decibels per millimeter; melting point 96° C.; Aldrich 85,158-2), 30 percent by weight of a conductive complex comprising a 50/50 blend by weight of 4,4'-methylene bis (2,6-dimethylaniline) (melting point 122° C.; Aldrich 36,079-1 and 2,4-dinitrobenzene sulfonic acid dihydrate (melting point 108° C.; conductivity 7.6 log (picomho/cm); Aldrich 38,106-3), 5 percent by weight tetrakis (2,4-ditertbutyl phenyl)-4,4'-biphenyl diphosphonite), and 5 percent by weight Sudan Blue 670 dye (C.I. 61554, obtained from BASF). The mixture was heated to a temperature of about 140° C. and stirred for a period of about 60 minutes until it formed a homogeneous solution, followed by cooling the solution to 25° C. The blue ink had a hardness value of 79 at 23° C., an acoustic loss value of 58 decibels per millimeter, a viscosity of 8.2 centipoise at 150° C., and a conductivity of 6.7 log (picomho/cm) at 150° C.

Yellow: A yellow phase change ink was prepared by mixing 15 percent by weight polyethylene oxidized (polymeric binder; number average molecular weight 1,300; viscosity at 125° C. 225 centipoise; Aldrich 19,191-4), 45 percent by weight 2,2-dimethyl-1-phenyl-1,3-propanediol (viscosity modifier; hardness value 75; acoustic loss value 29 decibels per millimeter; melting point 80° C.; Aldrich 40,873-5), 30 percent by weight of a conductive complex comprising a 50/50 blend by weight of 4,4'-methylene bis (2,6-dimethylaniline) (melting point 122° C.; Aldrich 36, 079-1) and 2-propanesulfonic acid sodium salt monohydrate (melting point 81° C.; conductivity 7.4 log (picomho/cm); Aldrich 39,701-6), 5 percent by weight tetrakis (2,4-ditertbutyl phenyl)-4,4'-biphenyl diphosphonite, and 5 percent by weight Sudan yellow 146 dye (C.I. 12700, obtained from BASF). The mixture was heated to a temperature of about 140° C. and stirred for a period of about 60 minutes until it formed a homogeneous solution, followed by cooling the solution to 25° C. The yellow ink had a hardness value of 78 at 23° C., an acoustic loss value of 61 decibels per millimeter, a viscosity of 9.0 centipoise at 150° C., and a conductivity of 6.8 log (picomho/cm) at 150° C.

Magenta: A magenta phase change ink was prepared by mixing 15 percent by weight poly (ethylene-co-acrylic acid), (acrylic acid content 20 mole percent; hardness value 78.6), 45 percent by weight (2,2'-(1,4-phenylenedioxy) diethanol) (hardness value 82; acoustic loss value 32 decibels per millimeter; melting point 102° C.; Aldrich 23,791-4), 30 percent by weight of a conductive complex comprising a 50/50 blend by weight of 4,4'-methylene bis (2,6-dimethylaniline) (melting point 122° C.; Aldrich 36,079-1) and hydroxymethane sulfinic acid monosodium salt dihydrate (melting point 70° C.; conductivity 7.2 (log (picomho/cm); Aldrich 16,351-1), 5 percent by weight tetrakis (2,4-ditert butyl phenyl)-4,4'-biphenyl diphosphonite, and 5 percent by weight Sudan Red 462 dye (C.I. 26050, obtained from BASF). The mixture was heated to a temperature of about 140° C. and stirred for a period of about 60 minutes until it formed a homogeneous solution, followed by cooling the solution to 25° C. The magenta ink had a hardness value of 78 at 23° C., an acoustic loss value of 57 decibels per millimeter, a viscosity of 8.3 centipoise at 150° C., and a conductivity of 6.6 log (picomho/cm) at 150° C.

Images were generated on the coating containing polyethylene, 10-bromo-1-decanol, UV absorber, antioxidant, antiozonant, hexadecyl tributyl phosphonium bromide, and filler on the coated papers. The images exhibited excellent color quality, hardness values of 79±1 at 23° C., and optical density values of 2.20 (black), 1.71 (cyan), 2.03 (magenta), and 1.40 (yellow), crease values of 0.09 mm (black), 0.08 mm (magenta), 0.10 mm (cyan), and 0.07 mm (yellow), and gloss values of 85 (black), 81 (magenta), 83 (cyan), and 78 (yellow). The waterfastness and lightfastness values of these images were greater than 95 percent in all cases.

EXAMPLE II

Paper Preparation

Coated papers were prepared by a solvent extrusion process (single side each time initially) on a Faustel Coater using a one slot die by providing for each paper base sheets (roll form) with a thickness of 150 microns, a Hercules size value of 1,000 seconds, and a porosity of 100 milliliters per minute, and coating the base sheets at 100° C. with a melt blend comprising 60.0 parts by weight of the extrudable binder poly(hexamethylene succinate) (#124, obtained from Scientific Polymer Products), 30.0 parts by weight of the plasticizer 2-bromo-α-methylbenzyl alcohol (Aldrich 32,724-7), and 10.0 percent by weight of the cationic antistatic compound benzyl dimethyl stearyl ammonium chloride monohydrate (Aldrich 22,901-6) in a thickness of 5 microns. This coating layer exhibited a porosity of 8 milliliters per minute.

The first layers thus formed were then overcoated with an ink receiving layer comprising 40.0 parts by weight of the hydrophilic binder starch (obtained from National Starch and Chemical Company), 20 parts by weight of the ink wetting agent pentaerythritol propoxylate ethoxylate (Aldrich 42,502-8), 24.0 parts by weight of the dye mordant quaternary acrylic copolymer latex polymethyl acrylate trimethyl ammonium chloride latex (HX42-1, obtained from Interpolymer Corporation), 3.0 parts by weight of the UV absorber poly(N,N-bis(2,2,6,6-tetramethyl-4-piperidinyl)-1,6-hexanediamine-co-2,4-dichloro-6-morpholino- 1,3,5-tria obtained from Aldrich Chemical Company), 2.0 parts by weight of the antioxidant citric acid (Aldrich 25,127-5), 1.0 part by weight of the biocide Nα(1-nitroethyl benzyl ethylene diamine) (Metasol J-26, obtained from Calgon Corporation), and 10.0 parts by weight of the filler Eccospheres MC-37 (sodium borosilicate glass), said coating composition being present in a concentration of 10 percent by weight in water. Subsequent to air drying at 100° C. and monitoring the difference in weight prior to and subsequent to coating, the dried paper base sheet rolls contained 1.0 gram, 11 microns in thickness, of the second, ink receiving layer.

Rewinding the coated side of the paper base sheets (roll form) onto empty cores and using these rolls, the uncoated sides of the paper base sheets were coated with a mixture prepared by melt-forming at 150° C. with processes encompassing slot-die casting using a composition comprising 45 parts by weight thermoplastic polymer poly(ethylene-co-acrylic acid) copolymer with acrylic content of 20 percent by weight and ethylene content of 80 percent by weight (18,104-8, obtained from Aldrich Chemical Company), 25 parts by weight plasticizer 2-bromo hexadecanoic acid (Aldrich 23,842-2), 2 parts by weight UV absorbing compound 2-(4-benzoyl-3-hydroxyphenoxy) ethylacrylate (Cyasorb UV-416,41,321-6, obtained from Aldrich Chemical Company), 2 parts by weight antioxidant compound 2,2'-methylenebis(6-tert-butyl-4-methylphenol) (Cyanox 2246, 41,315-5, obtained from Aldrich Chemical Company), 1 part by weight antiozonant compound bis-(1,2,3,6-tetrahydrobenzaldehyde) pentaerythritol acetal (Vulkazon AFS/LG, obtained from Mobay Corporation), 5 parts by weight antistatic agent sodium cocoyl isethionate (Geropon AC-270), and 20 parts by weight filler Opalex-C (blend of calcium fluoride and silica, obtained from Kemira. O.Y.) The thermoplastic coating composition was coated on the back side of the papers in a thickness of 5 microns. The coated papers thus formed were cut from this roll in 8.5 by 11.0 inch cut sheets.

Printing With Aqueous Inks

The coated papers thus prepared were then incorporated into a Hewlett-Packard® 500-C color ink jet printer containing inks of the compositions set forth in Example I. Images were generated on the coating containing starch, pentaerythritol propoxylate ethoxylate, polymethyl acrylate trimethyl ammonium chloride latex, UV absorber, antioxidant, biocide, and filler on the paper thus prepared. The resulting images had a gloss value of 88, optical density values before washing of 2.45 (black), 1.85 (cyan), 1.60 (magenta), and 1.15 (yellow) and optical density values after washing at 25° C. for two minutes of 2.40 (black), 1.75 (cyan), 1.50 (magenta), and 1.15 (yellow), which reflect waterfast values of 98 percent black, 95 percent cyan, 93.5 percent magenta, and 100 percent yellow. The optical densities of unwashed images after 72 hours in a Mark V Lightfast Tester (equivalent to three months of Sunshine) were measured at 2.40 (black), 1.70 (cyan), 1.45 (magenta), and 1.10 (yellow), which reflect lightfastness values of 98 percent black, 92 percent cyan, 90 percent magenta, and 96 percent yellow. The high image quality obtained on these coated papers was evidenced by their low edge raggedness values of 0.15 millimeter (between black and yellow), 0.23 millimeter (between cyan and yellow), 0.18 millimeter (between magenta and yellow), and 0.25 millimeter (between magenta and cyan).

Printing With Hot Melt Inks

The coated papers thus prepared were then incorporated into an acoustic ink jet print test fixture as disclosed in U.S. Pat. No. 4,745,419, the disclosure of which is totally incorporated herein by reference, equipped with a carrier for transporting a generally uniformly thick film of hot melt ink across its printhead, together with a heating means for liquefying the ink as it nears the printhead. The droplet ejectors were acoustically coupled to the ink via the carrier, and their output focal plane was essentially coplanar with the free surface of the liquefied ink, thereby enabling them to eject individual droplets of ink therefrom on command. The inks were moved across the printhead at a sufficiently high rate to maintain the free surface which it presents to the printhead at a substantially constant level. (A variety of carriers can be employed, including thin plastic and metallic belts and webs, and the free surface of the ink can be completely exposed or it can be partially covered by a mesh or perforated layer.) A separate heating element was provided for liquefying the ink, and the lower surface of the carrier was coated with a thin layer of electrically resistive material for liquefying the ink by localized resistive heating. A jetting frequency of 160 MHz was used to generate drops of about 2 picoliters, up to 12 drops per pixel at 600 spi. The ink compositions were as follows Black A black phase change ink composition was prepared by mixing 70 percent by weight of a solid conductive compound pyrazole (melting point 70° C.; acoustic loss value 29 decibels per millimeter; conductivity 7.7 log (picomho/cm; Aldrich P5,660-7), 15 percent by weight of a viscosity modifying compound 2-acetyl pyrrole (acoustic loss value 20 decibels per millimeter; melting point 85° C.; Aldrich 24,735-9), 5 percent by weight of a, UV absorber 2-(2H-benzotriazol-2-yl)-4,6-di-tert-pentyl phenol (Aldrich. 42,274-6), 5 percent by weight of an antioxidant tetrasodium-N-(1,2-dicarboxyethyl)-N-octadecyl sulfosuccinamate (Aerosol 22N, American Cyanamid Corporation), and 5 percent by weight of a colorant Neozapon Black X51 (C.I. Solvent Black C.I. 12195, obtained from BASF). The mixture was heated to a temperature of about 120° C. and stirred for a period of about 60 minutes until it formed a homogeneous solution, followed by cooling the solution to 25° C. The black ink had an acoustic loss value of 40 decibels per millimeter, a viscosity of 5.65 centipoise at 150° C., and a conductivity of 7.5 log (picomho/cm) at 150° C.

Blue: A blue phase change ink was prepared, by mixing 70 percent by weight of a conductive compound 1,1'-(1-ethylpropylidene) bis-1-H-pyrazole (melting point 63° C.; acoustic loss value 34 decibels per millimeter; conductivity 7.5 log (picomho/cm); Aldrich 39,414-9), 15 percent by weight of a viscosity modifying compound 5-mercapto-1-methyltetrazole (melting point 126° C.; acoustic loss value 31 decibels per millimeter; Aldrich 35,787-1), 5 percent by weight of a UV absorber 2-(2H-benzotriazol-2-yl)-4-(1,1,3,3-tetramethylbutyl) phenol (Aldrich 32,280-6), 5 percent by weight of an antioxidant tetrasodium-N-(1,2-dicarboxyethyl)-N-octadecyl sulfosuccinamate (Aerosol 22N, American Cyanamid Corporation), and 5 percent by weight of a colorant Sudan Blue 670 (C.I. 61554, obtained from BASF). The mixture was heated to a temperature of about 130° C. and stirred for a period of about 60 minutes until it formed a homogeneous solution, followed by cooling the solution to 25° C. The blue ink had an acoustic loss value of 37 decibels per millimeter, a viscosity of 5.72 centipoise at 150° C., and a conductivity of 7.5 log (picomho/cm) at 150° C.

Yellow: A yellow phase change ink was prepared by mixing 70 percent by weight of a conductive compound 2-undecyl imidazole (melting point 73° C.; acoustic loss value 33 decibels per millimeter; conductivity 8.0 log (picomho/cm); Aldrich 40,948-0), 15 percent by weight of a viscosity modifying compound 2-phenyl-2-imidazoline (melting point 97° C.; acoustic loss value 34 decibels per millimeter), 5 percent by weight of a UV absorber 2-(3-(2H-benzotriazol-2-yl)-4-hydroxyphenyl)ethyl methacrylate (Aldrich 41,343-7), 5 percent by weight of an antioxidant tetrasodium-N-(1,2-dicarboxyethyl)-N-octadecyl sulfosuccinamate (Aerosol 22N, American Cyanamid Corporation), and 5 percent by weight of a colorant Sudan Yellow 146 (C.I. 12700, obtained from BASF). The mixture was heated to a temperature of about 100° C. and stirred for a period of about 60 minutes until it formed a homogeneous solution, followed by cooling the solution to 25° C. The yellow ink had an acoustic loss value of 38 decibels per millimeter, a viscosity of 5.5 centipoise at 150° C., and a conductivity of 7.5 log (picomho/cm) at 150° C.

Magenta: A magenta phase change ink was prepared by mixing 70 percent by weight of a conductive compound 2-ethyl imidazole (melting point 86° C.; acoustic loss value 34 decibels per millimeter; conductivity 7.7 log (picomho/cm); Aldrich 23,934-8), 15 percent by weight of a viscosity modifying compound 2-methyl-2-imidazoline (melting point 87° C.; Aldrich 37,540-3), 5 percent by weight of a UV absorber) 4'-(imidazol-1-yl) acetophenone (Aldrich 18,373-3), 5 percent by weight of an antioxidant tetrasodium-N-(1,2-dicarboxyethyl)-N-octadecyl sulfdsuccinamate (Aerosol 22N, American Cyanamid Corporation), and 5 percent by weight of a colorant Sudan Red 462 (C.I. #26050, obtained from BASF). The mixture was heated to a temperature of about 120° C. and stirred for a period of about 60 minutes until it formed a homogeneous solution, followed by cooling the solution to 25° C. The magenta ink had an acoustic loss value of 38 decibels per millimeter, a viscosity of 5.8 centipoise at 150° C., and a conductivity of 7.5 log (picomho/cm) at 150° C.

Images were generated on the coating containing poly (ethylene-co-acrylic acid), 2-bromo hexadecanoic acid, UV absorber, antioxidant, antiozonant, sodium cocoyl isethionate, and filler on the coated papers. The images exhibited excellent color quality and sharp edges, with optical density values of 2.40. (black), 1.95 (cyan), 2.1 (magenta), and 1.5 (yellow), lightfastness values of 97.5 percent (black), 98.5 percent (cyan), 97 percent (magenta), and 99 percent (yellow), and waterfastness values of 96.5 percent (black), 97 percent (cyan), 98 percent (magenta), and 100 percent (yellow). The images obtained with these inks on the papers were folded and creased. The crease values were 3 for black, 8 for cyan, 7 for magenta, and 5 for yellow.

Other embodiments and modifications of the present invention may occur to those of ordinary skill in the art subsequent to a review of the information presented herein; these embodiments and modifications, as well as equivalents thereof, are also included within the scope of this invention.

What is claimed is:

1. A recording substrate which comprises (a) a cellulosic substrate having a first surface and a second surface opposite the first surface; (b) on the first surface of the cellulosic substrate and in contact therewith, a first coating comprising (i) an extrudable polyester, (ii) a plasticizer, and (iii) an antistatic agent; (c) on the first surface of the cellulosic substrate and in contact with the first coating, a second coating comprising (i) a hydrophilic binder, (ii) an ink wetting agent, (iii) a lightfastness-imparting agent, (iv) a cationic dye mordant, (v) a filler, and (vi) an optional biocide; and (d) on the second surface of the cellulosic substrate and in contact therewith, a third coating comprising (i) an extrudable alkylene polymer, (ii) an antistatic agent, (iii) a lightfastness-imparting agent, (iv) a plasticizer, and (v) a filler.

2. A recording substrate according to claim 1 wherein the plasticizer in the first coating is allyl acetoacetate, N-allyl aniline, 4-allyl anisole, allyl benzene, N-allyl cyclopentylamine, allyl diethyl phosphonoacetate, 4-allyl-1, 2-dimethoxybenzene, 4-allyl-2,6-dimethoxyphenol, allyl diphenylphosphine, allyl alcohol propoxylate, tert-butyl N-allyl carbamate, allyl-6-methylphenol, 2-allylphenol, allyl phenyl ether, allyl phenyl sulfone, 3-allyl rhodanine, 4-bromobenzyl alcohol, 2-bromo-α-methylbenzyl alcohol, 5-bromo-2-methoxybenzyl alcohol, 2-bromo-α-methylbenzyl alcohol, 2-(bromoethyl)-2-(hydroxymethyl)-1,3-propanediol, or a mixture thereof.

3. A recording substrate according to claim 1 wherein the cationic dye mordant in the second coating is N-(lauroyl colamino formyl methyl) pyridinium chloride, N-(stearoyl colamino formyl methyl) pyridinium chloride, a quaternary acrylic copolymer latex of the formula

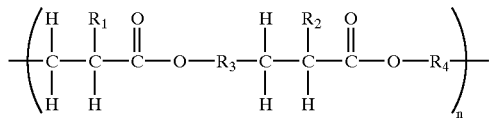

wherein n is a number representing the number of repeat monomer units, $R_1$ and $R_2$ each, independently of the other, is a hydrogen atom or an alkyl group, $R_3$ is a hydrogen atom, an alkyl group, or an aryl group, and $R_4$ is —N(CH$_3$)$_3^+$X$^-$, wherein X is an anion, and the degree of quaternization is from about 1 to about 100 percent, a polyquaternary amine, a quaternary ammonium block copolymer, or a mixture thereof.

4. A recording substrate according to claim 1 wherein the plasticizer in the third coating is allyl acetoacetate, N-allyl aniline, 4-allyl anisole, allyl benzene, N-allyl cyclopentylamine, allyl diethyl phosphonoacetate, 4-allyl-1, 2-dimethoxybenzene, 4-allyl-2,6-dimethoxyphenol, allyl diphenylphosphine, allyl alcohol propoxylate, tert-butyl N-allyl carbamate, allyl-6-methylphenol, 2-allylphenol, allyl phenyl ether, allyl phenyl sulfone, 3-allyl rhodanine, 4-bromobenzyl alcohol, 2-bromo-α-methylbenzyl alcohol, 5-bromo-2-methoxybenzyl alcohol, 2-bromo-α-methylbenzyl alcohol, 2-(bromoethyl)-2-(hydroxymethyl)-1,3-propanediol, octadecane, 1-octadecanol, tricosane, tetracosane, pentacosane,) heptacosane, octacosane, triacontane, 1-bromodecane, 10-bromo-1-decanol, 11-bromo-1-undecanol, 11-bromo-undecanoic acid, 12-bromo- 1-dodecanol, 12-bromo-dodecanoic acid, 2-bromo hexadecanoic acid, or a mixture thereof.

5. A recording substrate which comprises (a) a cellulosic substrate having a first surface and a second surface opposite the first surface; (b) on the first surface of the cellulosic substrate and in contact therewith, a first coating comprising (i) an extrudable polyester, (ii) a plasticizer, and (iii) an antistatic agent; (c) on the first surface of the cellulosic substrate and in contact with the first coating, a second coating comprising (i) a hydrophilic binder, (ii) an ink wetting agent, (iii) a lightfastness-imparting agent, (iv) a cationic dye mordant, (v) a filler, and (vi) an optional biocide; and (d) on the second surface of the cellulosic substrate and in contact therewith, a third coating comprising (i) an extrudable alkylene polymer, (ii) an antistatic agent, (iii) a lightfastness-imparting agent, (iv) a plasticizer, and (v) a filler, wherein the extrudable polyester in the first coating is polyethylene terephthalate or poly(hexamethylene succinate), the plasticizer in the first coating is 4-allyl anisole or 2-bromo-α-methylbenzyl alcohol, the antistatic agent in the first coating is disodium N-alkyl-sulfosuccinamate or 2-bromo-α-methylbenzyl alcohol, the hydrophilic binder in the second coating is methylcellulose or starch, the ink wetting agent in the second coating is poly(ethylene oxide) or pentaerythritol propoxylate ethoxylate, the cationic dye mordant in the second coating is a polymethyl acrylate trimethyl ammonium chloride latex, the extrudable alkylene polymer in the third coating is polyethylene or a poly(ethylene-co-acrylic acid) copolymer, the antistatic agent in the third coating is hexadecyl tributyl phosphonium bromide or sodium cocoyl isethionate, and the plasticizer in the third coating is 10-bromo-1-decanol or 2-bromo hexadecanoic acid.

6. A printing process which comprises incorporating an ink composition into an ink jet printing apparatus and causing droplets of the ink to be ejected in an imagewise pattern onto, a recording substrate according to claim 1.

7. A printing process according to claim 6 wherein the printing apparatus employs an acoustic ink jet process, wherein droplets of the ink are caused to be ejected in imagewise pattern by acoustic beams.

8. A printing process according to claim 6 wherein the printing apparatus employs an aqueous ink that is liquid at ambient temperatures.

9. A printing process according to claim 8 wherein the aqueous ink comprises water, sulfolane, butyl carbitol, and a colorant.

10. A printing process according to claim 9 wherein the aqueous ink further comprises ammonium bromide, N-cyclohexylpyrrolidinone, tris(hydroxymethyl) aminomethane, EDTA, polyethylene oxide, and a biocide.

11. A printing process according to claim 8 wherein the aqueous ink comprises water, sulfolane, pantothenol, 1,4-bis(2-hydroxyethyl)-2-butyne, 2,2'-sulfonyldiethanol, and carbon black.

12. A printing process according to claim 11 wherein the aqueous ink further comprises polyethylene oxide and a biocide.

13. A printing process according to claim 6 wherein the printing apparatus employs a hot melt ink jet process, wherein a solid ink is incorporated into the printing apparatus, and wherein the process comprises melting the ink and causing droplets of the melted ink to be ejected in an imagewise pattern onto the recording substrate.

14. A printing process according to claim 13 wherein the solid ink comprises polyethylene monoalcohol, 4-hydroxy-3-methoxy benzyl alcohol, a conductive complex comprising a 50/50 blend by weight of 4,4'-methylene bis (2,6-dimethylaniline) and toluenesulfonic acid monohydrate, and a colorant.

15. A printing process according to claim 13 wherein the solid ink comprises polyethylene-block-poly(ethylene glycol), xylitol, a conductive complex comprising a 50/50 blend by weight of 4,4'-methylene bis (2,6-dimethylaniline) and 2,4-dinitrobenzene sulfonic acid dihydrate, and a colorant.

16. A printing process according to claim 13 wherein the solid ink comprises polyethylene oxidized, 2,2-dimethyl-1-phenyl-1,3-propanediol, a conductive complex comprising a 50/50 blend by weight of 4,4'-methylene bis (2,6-dimethylaniline) and 2-propanesulfonic acid sodium salt monohydrate, and a colorant.

17. A printing process according to claim 13 wherein the solid ink comprises poly (ethylene-co-acrylic acid), (2,2'-(1, 4-phenylenedioxy) diethanol), a conductive complex comprising a 50/50 blend by weight of 4,4'-methylene bis (2,6-dimethylaniline) and hydroxymethane sulfinic acid monosodium salt dihydrate, and a colorant.

18. A printing process according to claim 13 wherein the solid ink comprises pyrazole, 2-acetyl pyrrole, and a colorant.

19. A printing process according to claim 13 wherein the solid ink comprises 1,1'-(1-ethyl propylidene) bis-1-H-pyrazole, 5-mercapto- 1-methyltetrazole, and a colorant.

20. A printing process according to claim 13 wherein the solid ink comprises 2-undecyl imidazole, 2-phenyl-2-imidazoline, and a colorant.

21. A printing process according to claim 13 wherein the solid ink comprises 2-ethyl imidazole, 2-methyl-2-imidazoline, and a colorant.

22. A printing process according to claim 8 wherein the aqueous ink is ejected in an imagewise pattern onto the second coating of the substrate.

23. A printing process according to claim 13 wherein the ink is ejected in an imagewise pattern onto the third coating of the substrate.

24. A printing process according to claim 13 wherein the printing apparatus employs an acoustic ink jet process, wherein droplets of the ink are caused to be ejected in imagewise pattern by acoustic beams.

25. A recording substrate according to claim 1 wherein the extrudable polyester in the first coating is poly(vinyl stearate), poly(vinyl propionate), poly(vinyl pivalate), poly (vinyl neodecanoate), poly vinyl acetate, poly(ethylene adipate), polyethylene succinate), polyethylene azelate), poly(1,4-butylene adipate), poly(trimethylene adipate), poly (trimethylene glutarate), poly(trimethylene succinate), poly (hexamethylene succinate), poly(diallyl phthalate), poly (diallyl isophthalate), poly(vinylidene chloride-co-methyl acrylate), poly(vinylidene fluoride-co-hexafluoropropylene), poly(chloro trifluoroethylene), polyethylene terephthalate, or mixtures thereof.

26. A recording substrate according to claim 1 wherein the extrudable polyester in the first coating is polyethylene terephthalate or poly(hexamethylene succinate).

27. A recording substrate according to claim 1 wherein the plasticizer in the first coating is 4-allyl anisole or 2-brom-α-methylbenzyl alcohol.

28. A recording substrate according to claim 1 wherein the antistatic agent in the first coating is a dodecylbenzene sulfonate, sodium alpha-olefin sulfonate, disodium dodecyl diphenyl oxide disulfonate, a naphtholene sulfonate, a sulfosuccinate, disodium N-alkyl-sulfosuccinamate, sodium oleyl N-methyl taurate, sodium cocoyl isethionate, an organic phosphate ester, benzyl dimethyl tetradecyl ammonium chloride dihydrate, benzyl dimethyl stearyl ammonium chloride monohydrate, cetyl pyridinium bromide monohydrate, dodecyl pyridinium chloride monohydrate, hexadecyl tributyl phosphonium bromide, 1,12-diaminododecane, stearyl tributyl phosphonium bromide, benzyl dodecyl dimethyl ammonium bromide, tetrabutyl ammonium chloride hydrate, or mixtures thereof.

29. A recording substrate according to claim 1 wherein the antistatic agent in the first coating is disodium N-alkyl-sulfosuccinamate or 2-bromo-α-methylbenzyl alcohol.

30. A recording substrate according to claim 1 wherein the ink wetting agent in the second coating is poly(ethylene oxide) or pentaerythritol propoxylate ethoxylate.

31. A recording substrate according to claim 1 wherein the cationic dye mordant in the second coating is a polymethyl acrylate trimethyl ammonium chloride latex.

32. A recording substrate according to claim 1 wherein the extrudable alkylene polymer in the third coating is polyethylene, polypropylene, poly(1-butene), poly (isobutylene), a poly (propylene-co-ethylene) copolymer, a poly(ethylene-co-1-butene) copolymer, a poly tethylene-co-1-butene-co-1-hexene) copolymer, a poly(ethylene-co-methylacrylate) copolymer, a poly(ethylene-co-methylocrylote-co-glycidyl methacrylate) copolymer, a poly (ethylene-co-ethylacrylate) copolymer, a poly(ethylene-co-ethylacrylate-co-moleic anhydride) copolymer, a poly (ethylene-co-butylocrylate) copolymer, a poly(ethylene-co-butylocrylate-co-carbon monoxide) copolymer, a poly (ethylene-co-glycidylyl methacrylate) copolymer, a poly (ethylene-co-carbon monoxide) copolymer, a poly(ethylene-co-acrylic acid) copolymer, a poly(ethylene-co-acrylic acid) copolymer sodium salt, a poly(ethylene-co-acrylic acid) copolymer zinc salt, a poly(ethylene-co-methacrylic acid) copolymer, a poly(ethylene-co-methacrylic acid) copolymer lithium salt, a poly(ethylene-co-methacrylic acid) copolymer sodium salt, a poly(ethylene-co-methacrylic acid) copolymer zinc salt, a poly(ethylene-co-vinylacetate-co-methacrylic acid) copolymer, a poly(ethylene-co-vinyl acetate-co-carbon monoxide) copolymer, a poly(ethylene-co-vinyl acetate)-graft-poly(maleic anhydride) copolymer, a poly(ethylene)-graft-poly(maleic anhydride) copolymer, a poly(propylene-co-1-butene) copolymer, a poly(propylene-co-1-hexene) copolymer, a poly(propylene-co-1-butene-co-ethylene) copolymer, a poly(propylene)-graft-poly(maleic anhydride) copolymer, a poly(isobutylene-co-isoprene) copolymer, a poly(ethylene-co-propylene-co-diene) terpolymer, a polystyrene-block-polyisopyrene copolymer, a polystyrene-block-polybutadiene copolymer, a polystyrene-block-polyisoprene-block-polystyrene copolymer, a polystyrene-block-poly(ethylene-random-butylene)-block-polystyrene copolymer, or mixtures thereof.

33. A recording substrate according to claim 1 wherein the extrudable alkylene polymer in the third coating is polyethylene or a poly(ethylene-co-acrylic acid) copolymer.

34. A recording substrate according to claim 1 wherein the antistatic agent in the third coating is a dodecylbenzene sulfonate, sodium alpha-olefin sulfonate, disodium dodecyl diphenyl oxide disulfonate, a naphthalene sulfonate, a sulfosuccinate, disodium N-alkyl-sulfosuccinamate, sodium oleyl N-methyl taurate, sodium cocoyl isethionate, an organic phosphate ester, benzyl dimethyl tetradecyl ammonium chloride dihydrate, benzyl dimethyl stearyl ammonium chloride monohydrate, cetyl pyridinium bromide monohydrate, dodecyl pyridinium chloride monohydrate, hexadecyl tributyl phosphonium bromide, 1,12-diaminododecane, stearyl tributyl phosphonium bromide, benzyl dodecyl dimethyl ammonium bromide, tetrabutyl ammonium chloride hydrate, or mixtures thereof.

35. A recording substrate according to claim 1 wherein the antistatic agent in the third coating is hexadecyl tributyl phosphonium bromide or sodium cocoyl isethionate.

36. A recording substrate according to claim 1 wherein the plasticizer in the third coating is allyl diethyl phosphonoocetate, octadecane, 1 octadecanol, tricosane, tetracosane, pentacosane, heptacosane, octacosane, triacontane, 1-bromodecane, 10-bromo-1-decanol, 11-bromo-1-undecanol, 11-bromo-undecanoic acid, 12-bromo-1-dodecanol, 12-bromo-dodecanoic acid, 2-bromo hexadecanoic acid, or mixtures thereof.

37. A recording substrate according to claim 1 wherein the plasticizer in the third coating is 10-bromo-1-decanol or 2-bromo hexadecanoic acid.

* * * * *